United States Patent
Kim et al.

(10) Patent No.: US 11,151,397 B2
(45) Date of Patent: *Oct. 19, 2021

(54) LIVENESS TESTING METHODS AND APPARATUSES AND IMAGE PROCESSING METHODS AND APPARATUSES

(71) Applicant: Samsung Electronics Co., Ltd., Suwon-si (KR)

(72) Inventors: Wonjun Kim, Hwaseong-si (KR); Sungjoo Suh, Seoul (KR); Jaejoon Han, Seoul (KR); Wonjun Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 815 days.

This patent is subject to a terminal disclaimer.

(21) Appl. No.: 15/156,847

(22) Filed: May 17, 2016

(65) Prior Publication Data

US 2016/0328623 A1    Nov. 10, 2016

Related U.S. Application Data

(63) Continuation of application No. 14/612,632, filed on Feb. 3, 2015, now Pat. No. 9,679,212.

(30) Foreign Application Priority Data

May 9, 2014   (KR) .................. 10-2014-0055687
Jun. 24, 2014  (KR) .................. 10-2014-0077333

(51) Int. Cl.
*G06K 9/00* (2006.01)
*G06T 7/00* (2017.01)
(Continued)

(52) U.S. Cl.
CPC ..... *G06K 9/00906* (2013.01); *G06K 9/00228* (2013.01); *G06K 9/00268* (2013.01);
(Continued)

(58) Field of Classification Search
CPC . G06F 11/0718; G06F 21/32; G06K 9/00268; G06K 9/00906; G06K 9/4609;
(Continued)

(56) References Cited

U.S. PATENT DOCUMENTS 5,487,172 A * 1/1996 Hyatt .................. B60R 16/0373
                                                        700/8
7,620,212 B1 * 11/2009 Allen .................. G06K 9/0004
                                                      340/5.53
(Continued)

FOREIGN PATENT DOCUMENTS

CN    10-1499164 A    8/2009
CN    10-2938144 A    2/2013
(Continued)

OTHER PUBLICATIONS

Q is for Quantum—An Encyclopedia of Particle Physics.*
(Continued)

*Primary Examiner* — Santiago Garcia
(74) *Attorney, Agent, or Firm* — Harness, Dickey & Pierce, P.L.C.

(57) ABSTRACT

A user recognition method and apparatus, the user recognition method including performing a liveness test by extracting a first feature of a first image acquired by capturing a user, and recognizing the user by extracting a second feature of the first image based on a result of the liveness test, is provided.

18 Claims, 15 Drawing Sheets

(51) Int. Cl.
  *G06T 7/55* (2017.01)
  *G06K 9/46* (2006.01)
(52) U.S. Cl.
  CPC .......... *G06K 9/4661* (2013.01); *G06T 7/0002* (2013.01); *G06T 7/55* (2017.01); *G06K 9/00* (2013.01); *G06T 2207/10004* (2013.01); *G06T 2207/10016* (2013.01); *G06T 2207/10028* (2013.01); *G06T 2207/30201* (2013.01)
(58) Field of Classification Search
  CPC ........... G06K 9/00899; G06K 9/00107; G06K 9/00885; G06K 9/2018; G06K 9/00302; G06K 9/00288; G06K 9/0004; G06K 9/00228; G06K 9/00261; G06K 9/00597; G06K 9/00604; G06K 9/00617; G06K 9/00892; G06K 9/00912; G06T 2207/30201; G06T 7/0002; G06T 7/0048; G06T 7/0081; G06T 7/0083; G09G 2360/16; G09G 5/02; H04L 9/3231; H04L 63/0861; G06Q 20/40145
  USPC ........ 382/115, 116, 117, 118, 203, 224, 226, 382/227, 274
  See application file for complete search history.

(56) References Cited

U.S. PATENT DOCUMENTS

| | | | |
|---|---|---|---|
| 8,503,800 | B2 | 8/2013 | Blonk et al. |
| 8,675,926 | B2* | 3/2014 | Zhang ............... G06K 9/00906 382/118 |
| 2004/0061777 | A1* | 4/2004 | Sadok ................. G08B 17/125 348/83 |
| 2006/0122834 | A1* | 6/2006 | Bennett ............. G10L 15/1822 704/256 |
| 2007/0268312 | A1 | 11/2007 | Marks et al. |
| 2008/0253622 | A1* | 10/2008 | Tosa ................... G06K 9/00604 382/117 |
| 2010/0097470 | A1* | 4/2010 | Yoshida ........... G08B 13/19641 348/159 |
| 2010/0189313 | A1* | 7/2010 | Prokoski ............. A61B 5/0064 382/118 |
| 2011/0187715 | A1* | 8/2011 | Jacobs ................ H04N 13/339 345/426 |
| 2011/0299741 | A1* | 12/2011 | Zhang ............... G06K 9/00228 382/117 |
| 2012/0013651 | A1* | 1/2012 | Trayner .................. G02B 5/32 345/690 |
| 2012/0155725 | A1* | 6/2012 | Bathe ..................... G06T 7/20 382/128 |
| 2013/0212655 | A1* | 8/2013 | Hoyos ................ G06K 9/00107 726/5 |
| 2013/0219480 | A1* | 8/2013 | Bud ....................... G06F 21/32 726/7 |
| 2013/0321672 | A1 | 12/2013 | Silverstein et al. |
| 2014/0168453 | A1* | 6/2014 | Shoemake ......... H04N 5/23206 348/207.11 |
| 2014/0201126 | A1* | 7/2014 | Zadeh .................... G06K 9/627 706/52 |
| 2014/0270404 | A1* | 9/2014 | Hanna ................ G06Q 30/0609 382/116 |
| 2014/0270409 | A1* | 9/2014 | Hanna ................ G06Q 30/0609 382/118 |
| 2014/0283113 | A1* | 9/2014 | Hanna ..................... G06F 21/32 726/27 |
| 2015/0124072 | A1 | 5/2015 | Wei et al. |
| 2015/0237273 | A1 | 8/2015 | Sawadaishi |
| 2015/0324629 | A1* | 11/2015 | Kim ................... G06K 9/00228 382/203 |
| 2015/0324993 | A1 | 11/2015 | Stein et al. |
| 2016/0085958 | A1* | 3/2016 | Kang ..................... G06F 21/40 726/19 |

FOREIGN PATENT DOCUMENTS

| | | | |
|---|---|---|---|
| JP | H8-189819 | A | 7/1996 |
| JP | H11-339048 | A | 12/1999 |
| JP | 2002/532807 | A | 10/2002 |
| JP | 2006-259923 | A | 9/2006 |
| JP | 2006-259931 | A | 9/2006 |
| JP | 2009-187130 | A | 8/2009 |
| JP | 2010-231398 | A | 10/2010 |
| JP | 2012-069133 | A | 4/2012 |
| KR | 0421221 | | 2/2004 |
| KR | 0421221 | B1 | 2/2004 |
| KR | 2005/0084448 | A | 8/2005 |
| KR | 0887183 | | 2/2009 |
| KR | 0887183 | B1 | 2/2009 |
| KR | 2011/0092752 | A | 8/2011 |

OTHER PUBLICATIONS

Notice of Allowance issued in U.S. Appl. No. 14/612,632, dated Jan. 25, 2017.
U.S. Office Action dated Oct. 17, 2017 in U.S. Appl. No. 15/499,164.
T. Brox,"A TV flow based local scale measure for texture discrimination," in Proc. ECCV, May 2004, 12 pgs.
J. Weickert, "Efficient and reliable schemes for nonlinear diffusion filtering," IEEE Trans. Image Process., vol. 7, No. 3, Mar. 1998, 14 pgs.
H. Seo, "Face verification using the lark representation," IEEE Tr. Information Forensics and Security, vol. 6, No. 4, Dec. 2011, 12 pgs.
B. Wang, "Illumination Normalization Based on Weber's Law With Application to Face Recognition", IEEE Signal Processing Letters, Aug. 2011, 4 pgs., vol. 18, No. 8.
T. Chen, "Total Variation Models for Variable Lighting Face Recognition", IEEE Transactions on Pattern Analysis and Machine Intelligence, Sep. 2006, vol. 28, No. 9, IEEE Computer Society.
W. Kim, "Face Liveness Detection from a Single Image via Nonlinear Diffusion Speed Model", 1Multimedia Processing Lab., SAIT, SEC, 130, 2014, 2 pgs.
Extended European Search Report issued in European Patent Application No. 15163789, dated Nov. 20, 2015.
Tan, et al., "Face Liveness Detection from a Single Image with Sparse Low Rank Bilinear Discriminative Model", Department of Computer Science and Technology, ECCV 2010, Part VI, LNCS 6316, pp. 504-517.
Kim, et al., Face Liveness Detection From A Single Image Via Diffusion Speed Model, IEEE Transactions on Imafe Processing, vol. 24, No. 8, Aug. 2015, pp. 2456-2465.
Scherzer, et al., "Variational Methods in Imaging", Springer Science & Business Media, Jan. 1, 2009, pp. 185-203.
U.S. Office Action dated Jun. 1, 2017 in U.S. Appl. No. 15/499,164.
Final Office Action dated May 17, 2018 in U.S. Appl. No. 15/499,164.
Office Action for corresponding U.S. Appl. No. 14/612,632 dated Aug. 30, 2016.
Pierre Buyssens, Marinette Revenu. Label Diffusion on Graph for Face Identification. ICB, Mar. 2012, New Delhi, India. pp. 46-51, 2012.
Office Action for corresponding U.S. Appl. No. 14/612,632 dated Mar. 14, 2016.
Non-Final Office Action dated Oct. 23, 2018 in U.S. Appl. No. 15/499,164.
Office Action dated Nov. 27, 2018 in Japanese Patent Application No. 2015-056767.
Extended European Search Report dated Sep. 22, 2020 in European Application No. 20169859.4.
Yu-Jin Zhang, "Advances in Face Image Analysis: Techniques and Technologies," Tsinghua University, Jan. 1, 2020, Beijing, China.
Joachim Weickert, "Anisotropic Diffusion in Image Processing," Department of Computer Science, University of Copenhagen, Jan. 1, 1998, Copenhagen, Denmark.
Notice of Allowance dated Mar. 13, 2019, in U.S. Appl. No. 15/499,164.

* cited by examiner

510

520

LIVENESS TESTING METHODS AND APPARATUSES AND IMAGE PROCESSING METHODS AND APPARATUSES

CROSS-REFERENCE TO RELATED APPLICATIONS

This application is a Continuation of and claims priority under 35 U.S.C. § 120 to U.S. application Ser. No. 14/612,632, filed Feb. 3, 2015, which claims priority under 35 U.S.C. § 119 to Korean Patent Application No. 10-2014-0055687, filed on May 9, 2014, and Korean Patent Application No. 10-2014-0077333, filed on Jun. 24, 2014, in the Korean Intellectual Property Office, the entire contents of which are incorporated herein by reference.

BACKGROUND

Field

One or more example embodiments relate to liveness testing methods, liveness testing apparatuses, image processing methods, image processing apparatuses, and/or electronic devices including the same.

Description of the Related Art

Biometric technologies may identify a human based on unique biometric characteristics of each individual user. Among conventional biometric technologies, a face recognition system may naturally recognize a user based on the user's face without requiring user contact with a sensor, such as a fingerprint scanner or the like. However, conventional face recognition systems may be vulnerable to impersonations using a picture of a face of a registered target.

SUMMARY

At least one example embodiment provides a user recognition method including: receiving a first image acquired by capturing a user; performing a liveness test by extracting a first feature of the first image; and recognizing the user by extracting a second feature of the first image based on a result of the liveness test. The first image may correspond to a first frame in a video, and the new image may correspond to a second frame in the video.

According to at least some example embodiments, the user recognition method further include, in a case in which the result of the liveness test corresponds to a failed test: receiving a new image; performing a liveness test by extracting a first feature of the new image; and recognizing the user by extracting a second feature of the new image based on a result of the liveness test on the new image.

The performing may include: generating a second image by diffusing a plurality of pixels included in the first image; calculating diffusion speeds of the pixels based on a difference between the first image and the second image; and extracting the first feature based on the diffusion speeds.

The generating may include: iteratively updating value of the pixels using a diffusion equation.

The extracting of the first feature may include: estimating a surface property related to an object included in the first image based on the diffusion speeds. The surface property may include at least one of a light-reflective property of a surface of the object, a number of dimensions of the surface of the object, or a material of the surface of the object.

The extracting of the first feature may include at least one of: calculating a number of pixels corresponding to a diffusion speed greater than or equal to a first threshold, among the diffusion speeds; calculating a distribution of the pixels corresponding to the diffusion speed greater than or equal to the first threshold, among the diffusion speeds; calculating at least one of an average or a standard deviation of the diffusion speeds; or calculating a filter response based on the diffusion speeds.

The extracting of the first feature may include: extracting a first-scale region from the first image based on the diffusion speeds; and calculating an amount of noise components included in the first-scale region based on a difference between the first-scale region and a result of applying median filtering to the first-scale region.

The performing may include: determining whether an object included in the image has a planar property or a three-dimensional (3D) structural property, based on the first feature; outputting a signal corresponding a failed test in a case in which the object is determined to have the planar property; and outputting a signal corresponding to a successful test in a case in which the object is determined to have the 3D structural property.

The performing may include: calculating a degree of uniformity in a distribution of light energy included in a plurality of pixels corresponding to an object included in the image based on the first feature; outputting a signal corresponding to a failed test in a case in which the degree of uniformity in the distribution of the light energy is greater than or equal to a threshold; and outputting a signal corresponding to a successful test in a case in which the degree of uniformity in the distribution of the light energy is less than the threshold.

The performing may further include at least one of: determining whether the first feature corresponds to a feature related to a medium that displays a face or a feature related to an actual face; outputting a signal corresponding to a failed test in a case in which the first feature corresponds to the feature related to a medium that displays a face; or outputting a signal corresponding to a successful test in a case in which the first feature corresponds to the feature related to an actual face.

The user recognition method may further include receiving a user verification request for approving an electronic commerce payment. The user recognition method may further include approving the electronic commerce payment in a case in which user verification succeeds in the recognizing.

The user recognition method may further include receiving a user input which requires user verification. The user recognition method may further include performing an operation corresponding to the user input in a case in which user verification succeeds in the recognizing. The user input which requires user verification may include at least one of a user input to unlock a screen, a user input to execute a predetermined application, a user input to execute a predetermined function in an application, or a user input to access a predetermined folder or file.

The user recognition method may further include receiving a user input related to a gallery including a plurality of items of contents. The user recognition method may further include sorting content corresponding to a user among the plurality of items of contents in the gallery in a case in which the user is identified in the recognizing; and providing the sorted content to the user.

At least one other example embodiment provides a user recognition method including: receiving a video acquired by capturing a user; performing a liveness test based on at least one first frame in the video; and recognizing the user based on at least one second frame in the video based on a result of the liveness test.

The performing may include at least one of: determining the video to be a live video in a case in which the result of the liveness test corresponds to a successful test; determining the video to be a fake video in a case in which the result of the liveness test corresponds to a failed test; or determining the video to be a live video in a case in which the at least one first frame includes a predetermined number of consecutive frames and a result of a liveness test on the consecutive frames corresponds to a successful test.

The at least one first frame may differ from the at least one second frame. For example, the at least one first frame may include at least one frame suitable for a liveness test, and the at least one second frame may include at least one frame suitable for user recognition.

At least one other example embodiment provides a user recognition apparatus including a processor configured to perform a liveness test by extracting a first feature of a first image acquired by capturing a user, and recognize the user by extracting a second feature of the first image based on a result of the liveness test.

BRIEF DESCRIPTION OF THE DRAWINGS

Example embodiments will become more apparent and more readily appreciated from the following description of the example embodiments shown in the drawings in which.

DETAILED DESCRIPTION

Figure 1A:
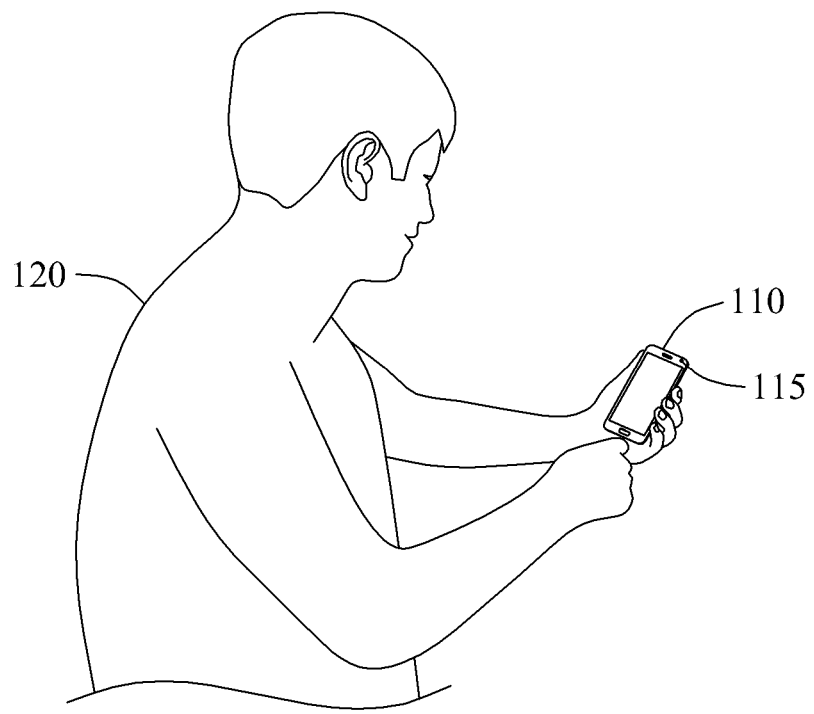
FIGS. 1A and 1B illustrate a liveness test according to example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, example embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing electronic devices, such as smartphones, personal digital assistants, laptop or tablet computers, etc. Such existing hardware may include one or more Central Processing Units (CPUs), graphics processing units (GPUs), image processors, system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Reference will now be made in detail to the example embodiments illustrated in the accompanying drawings, wherein like reference numerals refer to like elements throughout. Example embodiments are described below to explain the present disclosure by referring to the figures. One or more example embodiments described below may be applicable to various fields, for example, smartphones, laptop or tablet computers, smart televisions (TVs), smart home systems, smart cars, surveillance systems, etc. For example, one or more example embodiments may be used to test a liveness of an input image and/or authenticate a user to log into a smartphone or other device. In addition, one or more example embodiments may be used to test a liveness of an input image and/or authenticate a user for admission control and/or monitoring in a public area and/or a secured area.

Liveness Test According to Example Embodiments

Figure 1B:
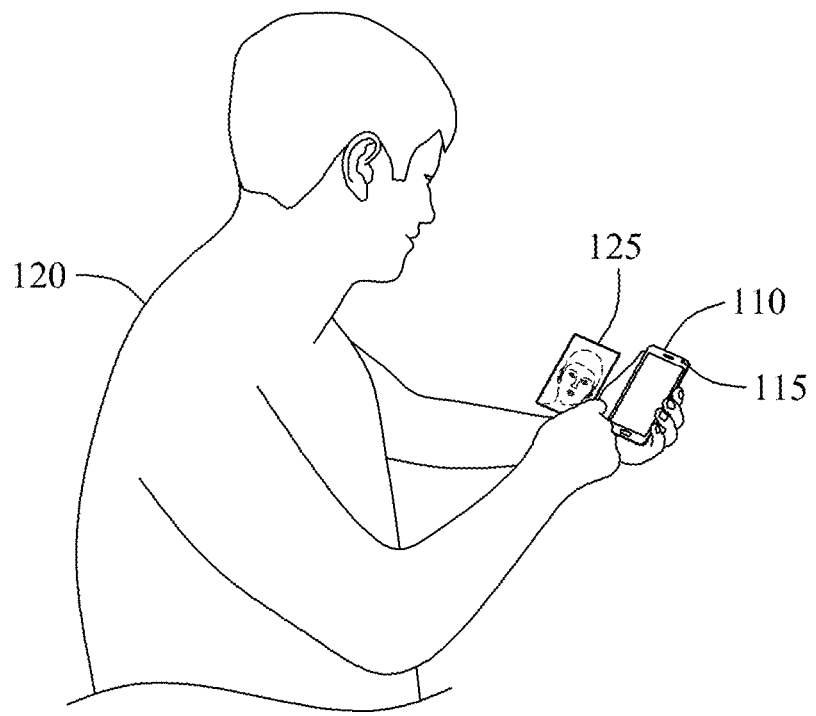

FIGS. 1A and 1B illustrate a liveness test according to an example embodiment.

According to at least some example embodiments, a liveness test refers to a method of testing (or determining) whether an object included in an input image corresponds to a real three dimensional object. In one example, the liveness test may verify whether a face included in an input image corresponds to (or is obtained from) a real three-dimensional (3D) object (e.g., an actual face) or a fake two-dimensional (2D) representation of the object (e.g., a picture of a face). Through the liveness test, an attempt to verify a face of another using a forged and/or falsified picture may be effectively rejected.

Referring to FIGS. 1A and 1B, according to at least one example embodiment, a liveness testing apparatus 110 receives an input image including a face of a user 120, and tests a liveness of the face included in the received input image. In one example, the liveness testing apparatus 110 may be (or be included in) a mobile device, for example, a mobile phone, a smartphone, a personal digital assistant (PDA), a tablet computer, a laptop computer, etc. In another example, the liveness testing apparatus 110 may be (or be included in) a computing device, for example, a personal computer (PC), an electronic product, such as a TV, a security device for a gate control, etc. The liveness testing apparatus 110 may receive the input image from an image sensor 115 that photographs the face of the user 120. The image sensor 115 may also be part of the liveness testing apparatus 110.

In one example, as shown in FIG. 1A, the input image is generated by photographing the actual face of the user 120. In this example, the liveness testing apparatus 110 determines that the face included in the input image corresponds to a real (or living) three-dimensional object, and outputs a signal indicating that the face included in the input image corresponds to a real three-dimensional object. That is, for example, the liveness testing apparatus 110 tests whether the face included in the input image corresponds to the real (or living) three-dimensional object, and outputs a signal indicating a successful test since the face in the input image does indeed correspond to the real (or living) three-dimensional object.

In another example, as shown in FIG. 1B, the input image is generated by photographing a face displayed on a display medium 125, rather than the actual face of the user 120. According to at least this example, the display medium 125 refers to a medium that displays an object (e.g., a face) in two dimensions. The display medium 125 may include, for example, a piece of paper on which a face of a user is printed (e.g., a photo), an electronic device displaying a face of a user, etc. In one example scenario, the user 120 may attempt to log into an electronic device (e.g., a smartphone or the like) with another user's account by directing a face displayed on the display medium 125 toward the image sensor 115. In FIG. 1B, the face displayed on the display medium 125 is marked with a broken line to indicate that the face displayed on the display medium 125 is directed toward the image sensor 115, rather than the user 120. In this example, the liveness testing apparatus 110 determines that the face included in the input image corresponds to a fake two-dimensional representation of the object, and outputs a signal indicating that the face included in the input image corresponds to a fake two-dimensional representation of the object. That is, for example, the liveness testing apparatus 110 tests whether the face included in the input image corresponds to the real (or living) three-dimensional object, and outputs a signal indicating a failed test since the face in the input image does not correspond to the real (or living) three-dimensional object, but rather the fake two-dimensional representation of the object. In some cases, the term fake object may be used to refer to the fake two-dimensional representation of the object.

The liveness testing apparatus 110 may detect a face region from the input image. In this example, liveness testing method and apparatus may be applicable to the face region detected from the input image.

Figure 2:
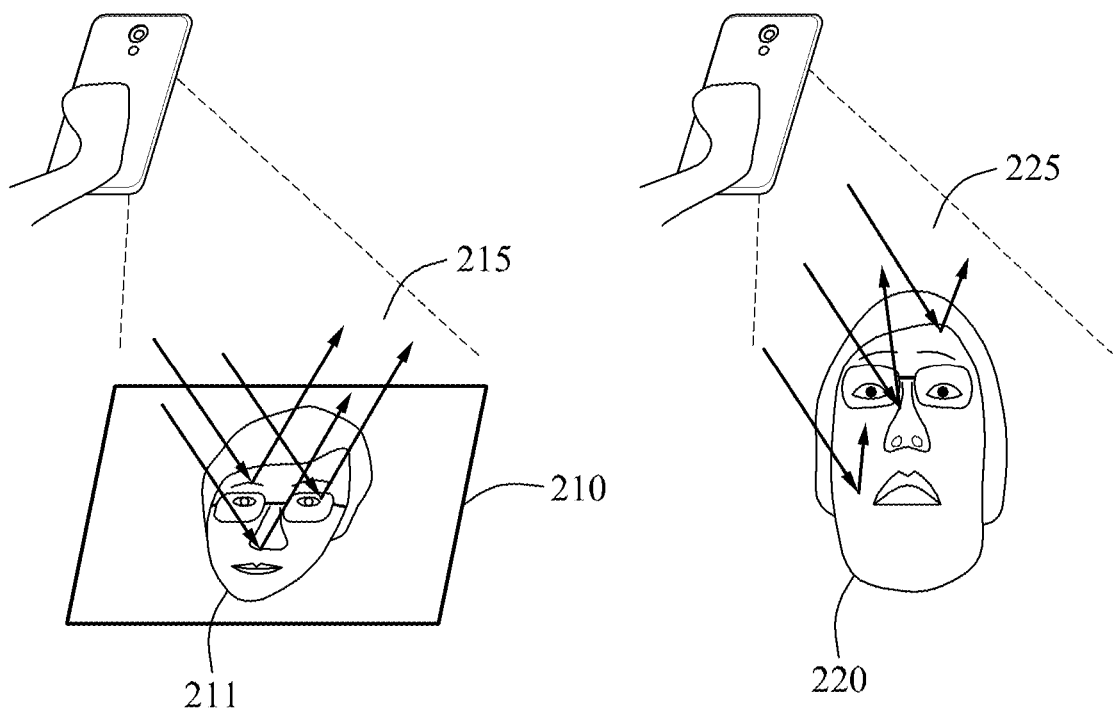
FIG. 2 illustrates a principle of a liveness test according to an example embodiment.

FIG. 2 illustrates a principle of a liveness test according to an example embodiment.

A liveness testing apparatus according to at least this example embodiment tests a liveness of an object included in an input image based on whether the object has one or more characteristics of a flat (two-dimensional) surface or a three-dimensional (3D) structure.

Referring to FIG. 2, the liveness testing apparatus distinguishes between a face 211 displayed on a medium 210 and an actual face 220 of a user. The face 211 displayed on the medium 210 corresponds to a two-dimensional (2D) flat surface. When an input image is generated by photographing the face 211 displayed on the medium 210, an object included in the input image has one or more characteristics of a flat surface. Since a surface of the medium 210 corresponds to a 2D flat surface, light 215 incident on the face 211 displayed on the medium 210 is more uniformly reflected by the surface of the medium 210. Thus, light energy is more uniformly distributed on the object included in the input image. Even if the medium 210 is curved, a surface of a curved display may still correspond to, and have characteristics, of a 2D flat surface.

Conversely, the actual face 220 of the user is a 3D structure. When an input image is generated by photographing the actual face 220 of the user, an object included in the input image has characteristics of a 3D structure. Since the actual face 220 of the user corresponds to a 3D structure having various 3D curves and shapes, light 225 incident to the actual face 220 of the user is less (or non-) uniformly reflected by a surface of the actual face 220 of the user. Thus, light energy is less (or non-) uniformly distributed on the object included in the input image.

According to at least one example embodiment, a liveness testing apparatus tests a liveness of an object included in an input image based on a distribution of light energy in the object. In one example, the liveness testing apparatus analyzes the distribution of light energy included in the object of the input image to determine whether the object included in the input image has characteristics of a flat 2D surface or of a 3D structure.

Still referring to FIG. 2, in one example, an input image may be generated by photographing the face 211 displayed on the medium 210. In this case, the liveness testing apparatus analyzes a distribution of light energy included in the face of the input image, and determines that the face of the input image has one or more characteristics of a flat surface. The liveness testing apparatus then determines that the face of the input image corresponds to a fake object, and outputs a signal indicating the same (e.g., indicating a failed test).

In another example, an input image may be generated by photographing the actual face 220 of the user. In this case, the liveness testing apparatus analyzes a distribution of light energy included in a face of the input image, and determines that the face of the input image has one or more characteristics of a 3D structure. The liveness testing apparatus then determines that the face of the input image corresponds to a real 3D object, and outputs a signal indicating the same (e.g., indicating a successful test).

According to at least some example embodiments, the liveness testing apparatus may determine a liveness of an object included in an input image based on a degree of uniformity in the distribution of light energy included in the object in the input image. With regard again to FIG. 2, in one example, since the light 215 incident to the face 211 displayed on the medium 210 is reflected substantially uniformly, light energy included in the face of the input image is distributed substantially uniformly. When a degree of uniformity in the distribution of the light energy included in the face of the input image is greater than or equal to a given (or alternatively, desired or predetermined) threshold degree of uniformity, the liveness testing apparatus determines that the face of the input image has one or more characteristics of a flat 2D surface. In this case, the liveness testing apparatus determines that the face of the input image corresponds to a fake object, and outputs a signal indicating the same (e.g., indicating a failed test).

In another example with regard to FIG. 2, since the light 225 incident on the actual face 220 of the user is less (or non-) uniformly reflected, light energy included in the face of the input image has a light distribution that is less (or non-) uniform. When a degree of uniformity in the distribution of the light energy included in the face of the input image is less than the given threshold degree of uniformity, the liveness testing apparatus determines that the face of the input image has one or more characteristics of a 3D structure. In this case, the liveness testing apparatus determines that the face of the input image corresponds to a real 3D object, and outputs a signal indicating the same (e.g., indicating a successful test).

In one example, the threshold degree of uniformity may be a value corresponding to a situation in which about 50% or more of a number of pixels included in an image portion correspond to a face region (e.g., more generally, a region in which a portion corresponding to a face region is indicated by a bounding box).

The liveness testing apparatus may test the liveness of an object based on a single input image. The single input image may correspond to a single picture, a single image, a still image of a single frame, etc. The liveness testing apparatus may test a liveness of an object included in a single input image by determining whether the object has one or more characteristics of a flat 2D surface or of a 3D structure. In more detail, for example, the liveness testing apparatus may test the liveness of the object included in the single input image by calculating a degree of uniformity in the distribution of light energy included in the object.

Figure 3:
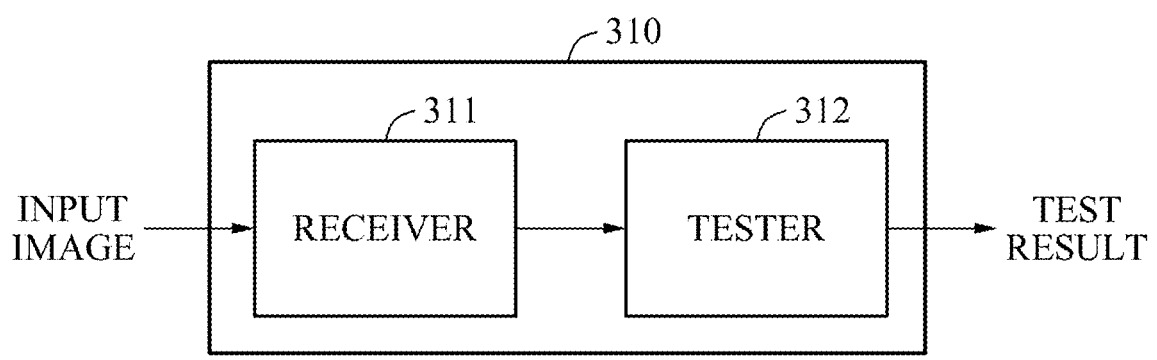
FIG. 3 illustrates a liveness testing apparatus according to an example embodiment.

FIG. 3 illustrates a liveness testing apparatus 310 according to an example embodiment.

Referring to FIG. 3, the liveness testing apparatus 310 includes a receiver 311 and a tester 312.

In example operation, the receiver 311 receives an input image. The receiver 311 may receive an input image generated by an image sensor (not shown). The receiver 311 may be connected to the image sensor using a wire, wirelessly, or via a network. Alternatively, the receiver 311 may receive the input image from a storage device, such as a main memory, a cache memory, a hard disk drive (HDD), a solid state drive (SSD), a flash memory device, a network drive, etc.

The tester 312 tests a liveness of an object included in the input image. As discussed above, the tester 312 may test the liveness of the object by determining whether the object has one or more characteristics of a flat 2D surface or of a 3D structure. In one example, a successful test is one in which the object is determined to have one or more characteristics of a 3D structure, whereas a failed test is one in which the object is determined to have one or more characteristics of a flat 2D surface. In more detail, for example, the tester 312 may test the liveness of the object by analyzing a distribution of light energy included in the object of the input image. In a more specific example, the tester 312 may test the liveness of the object by calculating a degree of uniformity in the distribution of the light energy included in the object of the input image, and comparing the degree of uniformity of the distribution of light energy in the object of the input image with a threshold value. If the determined degree of uniformity is greater than or equal to a threshold value, then the object in the input image is determined to correspond to (have been obtained from) a flat 2D surface. On the other hand, if the determined degree of uniformity is less than or equal to the threshold value, then the object in the input image is determined to correspond to (have been obtained from) a 3D structure.

According to at least some example embodiments, the tester 312 may filter a plurality of pixels corresponding to the object included in the input image to analyze the distribution of the light energy included in the plurality of pixels corresponding to the object included in the input image. In one example, the tester 312 may filter the plurality of pixels using a diffusion process. In this example, the tester 312 may diffuse a plurality of pixels corresponding to the object included in the input image to analyze the distribution of the light energy included in the plurality of pixels corresponding to the object included in the input image. An example diffusion process will be described in more detail below with reference to FIG. 4.

Although example embodiments may be discussed in detail with regard to a diffusion process, it should be understood that any suitable filtering processes may be used in connection with example embodiments. In one example, example embodiments may utilize bilateral filtering. Because bilateral filtering is generally well-known, a detailed description is omitted. Moreover, any suitable filtering that preserves an edge region and blurs a non-edge region, in a manner similar or substantially similar to diffusion and bilateral filtering, may be used in connection with example embodiments discussed herein.

Figure 4:
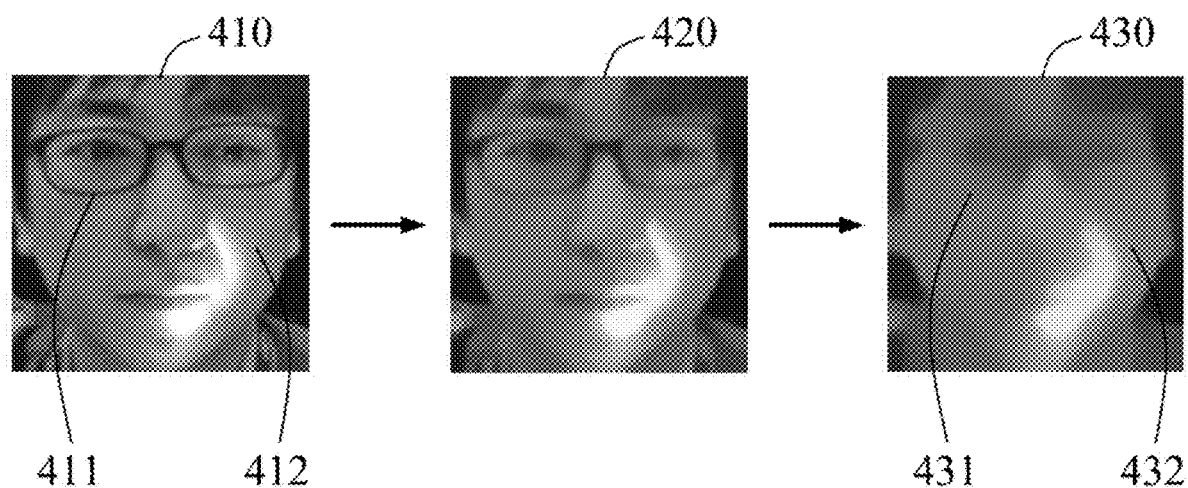
FIG. 4 illustrates a diffusion process according to an example embodiment.

FIG. 4 illustrates a diffusion process according to an example embodiment.

According to at least some example embodiments, a liveness testing apparatus may diffuse a plurality of pixels corresponding to an object included in an input image. The liveness testing apparatus may iteratively update values of the plurality of pixels using a diffusion equation. In one example, the liveness testing apparatus may diffuse the plurality of pixels corresponding to the object included in the input image according to Equation 1 shown below.

$$u^{k+1}=u^k+\text{div}(d(|\nabla u^k|)\nabla u^k) \quad \text{[Equation 1]}$$

In Equation 1, k denotes an iteration count, $u^k$ denotes a value of a pixel after a k-th iteration, and $u^{k+1}$ denotes a value of a pixel after a (k+1)-th iteration. A value of a pixel in the input image is denoted $u^0$.

Still referring to Equation 1, $\nabla$ denotes a gradient operator, div( ) denotes a divergence function, and d( ) denotes a diffusivity function.

The diffusivity function d( ) may be given (or alternatively, desired or predetermined) function. In one example, the diffusivity function may be defined as shown below in Equation 2.

$$d(|\nabla u|)=1/(|\nabla u|+\beta) \quad \text{[Equation 2]}$$

In Equation 2, $\beta$ denotes a relatively small positive number (e.g., a minute value, such as about $10^{-6}$). When the diffusivity function defined as shown above in Equation 2 is used, a boundary of an object may be preserved relatively well during the diffusion process. When the diffusivity function is a function of pixel gradient $\nabla u$ as shown in Equation 2, the diffusion equation is a nonlinear diffusion equation.

The liveness testing apparatus may apply an additive operator splitting (AOS) scheme to solve Equation 1, and the liveness testing apparatus may diffuse the plurality of pixels corresponding to the object included in the input image according to Equation 3 shown below.

$$u^{k+1}=\frac{1}{2}\left((I-2\tau A_x(u^k))^{-1}+(I-2\tau A_y(u^k))^{-1}\right)u^k \quad \text{[Equation 3]}$$

In Equation 3, I denotes a value of a pixel in an input image, $A_x$ denotes a horizontal diffusion matrix, $A_y$ denotes a vertical diffusion matrix, $\tau$ denotes a time step. A final iteration count L and the time step $\tau$ may be given (or alternatively desired or predetermined). In general, when the time step $\tau$ is set to be relatively small and the final iteration count L is set to be relatively large, a reliability of $u^L$ denoting a value of a finally diffused pixel may increase.

According to at least some example embodiments, the liveness testing apparatus may reduce the final iteration count L using the AOS scheme to solve Equation 1. When the AOS scheme is used, the reliability of $u^L$, which is the value of the finally diffused pixel, may be sufficiently high although a time step $\tau$ of a given size is used. The liveness testing apparatus may increase efficiency of an operation for the diffusion process using the AOS scheme to solve the diffusion equation. The liveness testing apparatus may perform the diffusion process using a relatively small amount of processor and/or memory resources.

The liveness testing apparatus may effectively preserve a texture of the input image using the AOS scheme to solve the diffusion equation. The liveness testing apparatus may effectively preserve the original texture of the input image even in relatively low-luminance and backlit environments.

Referring to FIG. 4, image 410 corresponds to an input image, image 420 corresponds to an intermediate diffusion image, and image 430 corresponds to a final diffusion image. In this example, the final iteration count L is set to "20". The image 420 was acquired after values of pixels included in the input image were iteratively updated five times based on Equation 3. The image 430 was acquired after the values of the pixels included in the input image were iteratively updated 20 times based on Equation 3.

According to at least this example embodiment, the liveness testing apparatus may use a diffusion speed to determine whether the object included in the input image has one or more characteristics of a flat surface or of a 3D structure. The diffusion speed refers to a speed at which each pixel value is diffused. The diffusion speed may be defined as shown below in Equation 4.

$$s(x,y)=|u^L(x,y)-u^0(x,y)| \quad \text{[Equation 4]}$$

In Equation 4, s(x, y) denotes a diffusion speed of a pixel at coordinates (x, y), $u^0$(x, y) denotes a value of the pixel at coordinates (x, y) in an input image, and $u^L$(x, y) denotes a value of the pixel at coordinates (x, y) in a final diffusion image. As shown in Equation 4, as a difference between a pixel value before diffusion and a pixel value after diffusion increases, a calculated diffusion speed also increase, whereas when the difference between the pixel value before diffusion and the pixel value after diffusion decreases, the calculated diffusion speed decreases.

More broadly, the liveness testing apparatus may determine whether the object included in the input image has one or more characteristics of a flat surface or of a 3D structure based on a magnitude of the change in pixel values in the image after L number of iterations of the above-discussed filtering process.

A face image may be divided into a small-scale region and a large-scale region. The small-scale region may refer to a region in which a feature point or a feature line is present. In one example, the small-scale region may include the eyes, the eyebrows, the nose, and the mouth of the face. The large-scale region may refer to a region in which a relatively large portion is occupied by skin of the face. In one example, the large-scale region may include the forehead and cheeks of the face.

Diffusion speeds of pixels belonging to the small-scale region may be greater than diffusion speeds of pixels belonging to the large-scale region. Referring back to the example shown in FIG. 4, a pixel 411 corresponding to eyeglass frames in the image 410 differs from neighboring pixels corresponding to skin, and thus, a value of the pixel 411 may change substantially (e.g., relatively greatly) as a result of diffusion. The value of the pixel 411 in the image 410 may be updated to a value of a pixel 431 in the image 430 by diffusion. Conversely, a pixel 412 corresponding to a cheek in the image 410 is similar to neighboring pixels, and thus, a value of the pixel 412 may change less than the value of the pixel 411 (e.g., relatively slightly) by diffusion. The value of the pixel 412 in the image 410 may be updated to a value of a pixel 432 in the image 430 as a result of diffusion.

A difference in diffusion speeds may also result from a distribution of light energy in an image. When light energy in the image is more uniformly distributed, a relatively small diffusion speed may be calculated. Moreover, when the light energy is more uniformly distributed, the probability of neighboring pixels having similar pixel values may be higher (e.g., relatively high). Conversely, when light energy in the image is less (or non-) uniformly distributed, a relatively high diffusion speed may be observed. Moreover, when the light energy is less (or non-) uniformly distributed, the probability of neighboring pixels having different pixel values may be relatively high.

According to at least some example embodiments, a liveness testing apparatus may calculate a degree of uniformity in the distribution of the light energy in the image based on statistical information related to diffusion speeds. The liveness testing apparatus may test a liveness of an object in the image based on the statistical information related to diffusion speeds. To calculate the statistical information related to diffusion speeds, the liveness testing apparatus may extract a small-scale region from an image according to Equation 5 shown below.

$$SR(x, y) = \begin{cases} 1, & \text{if } s(x, y) > \mu + \sigma \\ 0, & \text{otherwise} \end{cases} \quad \text{[Equation 5]}$$

In Equation 5, SR(x, y) is an indicator indicating whether a pixel at coordinates (x,y) belongs to a small-scale region. In this example, when a value of SR(x,y) corresponds to "1", the pixel at the coordinates (x,y) belongs to the small-scale region, whereas when the value of SR(x,y) corresponds to "0", the pixel at the coordinates (x,y) does not belong to the small-scale region.

The value of SR(x, y) may be determined based on a diffusion speed for the pixel at coordinates (x,y). For example, when the diffusion speed s(x,y) is greater than a given (or alternatively, desired or predetermined) threshold value, the value of SR(x,y) is determined to be "1". Otherwise, the value of SR(x,y) is determined to be "0". The threshold value may be set based on an average µ of the entire image and a standard deviation σ of the entire image. The average µ of the entire image may correspond to an average of diffusion speeds of pixels included in the entire image, and the standard deviation σ of the entire image may correspond to a standard deviation of the diffusion speeds of the pixels included in the entire image.

Hereinafter, an image in which a value of a pixel at coordinates (x,y) corresponds to SR(x,y) will be referred to as a small-scale region (SR) map. Since each pixel included in the SR map may have a value of "0" or "1", the SR map may also be referred to as a binary map. The SR map may effectively represent an underlying structure of a face in various illumination environments.

Figure 5:
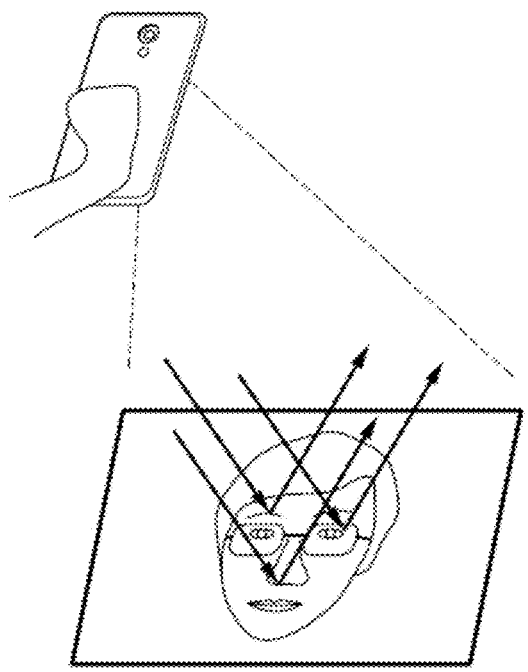
FIG. 5 illustrates an example small-scale region (SR) map according to example embodiments.
Figure 5:
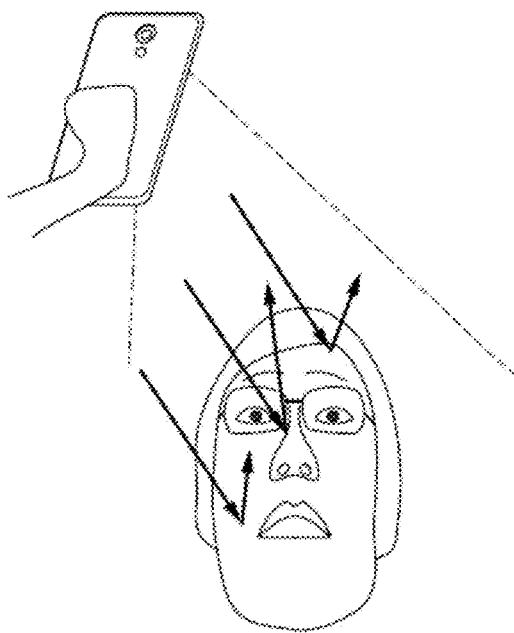
Figure 5:
Figure 5:

FIG. 5 illustrates two example SR maps according to example embodiments.

Referring to FIG. 5, as shown, the SR map 510 acquired when a medium displaying a face of a user is photographed differs from the SR map 520 acquired when the actual face of the same user is photographed. In the SR map 510 and the SR map 520, portions marked with black color correspond to pixels satisfying SR(x, y)=1, whereas portions marked with white color correspond to pixels satisfying SR(x, y)=0. In this example, in the SR map 510 and the SR map 520, the black portions have relatively fast diffusion speeds, and the white portions have relatively slow diffusion speeds.

According to at least one example embodiment, the liveness testing apparatus may test a liveness of a face in an image by analyzing an SR map. For example, the liveness testing apparatus may test the liveness of the face in the image by extracting various features from the SR map.

When an actual face of a user is photographed, various light reflections may occur due to curves on the actual face of the user.

When light energy in the image is less (or non-) uniformly distributed, a relatively large number of pixels having a pixel value of "1" may be included in the SR map. In this example, the liveness testing apparatus may determine the liveness of the face in the image based on Equation 6 shown below.

$$\text{Fake} = \begin{cases} 1, & \text{if } \sum_{(x,y)} N(SR(x, y) = 1) < \xi \\ 0, & \text{otherwise} \end{cases} \quad \text{[Equation 6]}$$

In Equation 6, N(SR(x, y)=1) denotes a number of pixels satisfying SR(x, y)=1, and denotes a threshold value, which may be given, desired, or alternatively preset. The liveness testing apparatus may determine that the face in the image corresponds to a fake object when $$\sum_{(x,y)} N(SR(x, y) = 1) < \xi$$

is satisfied.

In another example, when light energy in the image is less (non-) uniformly distributed, a relatively large amount of noise components may be included in the SR map. In this case, the liveness testing apparatus may determine the liveness of the face in the image based on Equation 7 shown below.

$$\text{Fake} = \begin{cases} 1, & \text{if } \sum_{(x,y)} |SR(x, y) - SR_M(x, y)| < \xi \\ 0, & \text{otherwise} \end{cases} \quad \text{[Equation 7]}$$

In Equation 7, $SR_M(x, y)$ denotes a value of a pixel at coordinates (x, y) in an image acquired by applying median filtering to an SR map, and denotes a threshold value, which may be given, desired, or alternatively preset. As the amount of noise components increases, a number of pixels having a difference between a value of SR(x, y) and a value of $SR_M(x, y)$ increase. In this example, when $$\sum_{(x,y)} |SR(x, y) - SR_M(x, y)| < \xi$$

is satisfied, the face in the image is determined to be a fake object.

Equations 6 and 7 are provided only as examples. The liveness testing apparatus may test the liveness of the object in the image based on a variety of diffusion speed based statistical information. In one example, the liveness testing apparatus may use a distribution of pixels having diffusion speeds greater than or equal to a given, desired or alternatively predetermined, threshold value.

In more detail, the liveness testing apparatus may determine the liveness of the face in the image based on Equation 8 shown below.

$$\text{Live} = \begin{cases} 1, & \text{if } \sum_{(x,y)} N(SR(x, y) = 1) \geq \xi \\ 0, & \text{otherwise} \end{cases} \quad \text{[Equation 8]}$$

The liveness testing apparatus may determine that the face in the image corresponds to a live 3D object when $\Sigma_{(x,y)} N(SR(x,y)=1 \geq \xi$ is satisfied.

In another example, the liveness testing apparatus may determine the liveness of the face in the image based on Equation 9 shown below.

$$\text{Live} = \begin{cases} 1, & \text{if } \sum_{(x,y)} |(SR(x, y) - SR_M(x, y)| \geq \xi \\ 0, & \text{otherwise} \end{cases} \quad \text{[Equation 9]}$$

In this example, when $\Sigma_{(x,y)} |SR(x,y) - SR_M(x,y)| \geq \xi$ is satisfied, the face in the image is determined to be a live 3D object.

The liveness testing apparatus may also use diffusion speed based statistical information without using an SR map. In this example, the liveness testing apparatus may use respective values of diffusion speeds of all pixels, an average of the diffusion speeds of all the pixels, and a standard deviation of the diffusion speeds of all the pixels. The liveness testing apparatus may also use a filter response based on diffusion speeds. The liveness testing apparatus may use a result of applying median filtering to diffusion speeds of all pixels.

According to at least some example embodiments, the liveness testing apparatus may extract various features based on diffusion speed based statistical information, and learn the extracted features. The liveness testing apparatus may calculate diffusion speed based statistical information from various training images, and enable a classifier to learn the features extracted from the statistical information, in a learning stage. The training images may include images of a live 3D object and images of a fake 2D object.

A simply structured classifier may obtain a distance between vectors (e.g., a Euclidian distance) or a similarity (e.g., a normalized correlation), and compare the distance between the vectors or the similarity to a threshold value. A neural network, a Bayesian classifier, a support vector machine (SVM), or an adaptive boosting (AdaBoost) learning classifier may be used as a more elaborate classifier.

The liveness testing apparatus may calculate diffusion speed based statistical information from an input image, and extract features from the statistical information using a given, desired, or alternatively predetermined, method. The method may correspond to the method used in the learning stage. The liveness testing apparatus may input the extracted features and learned parameters into the classifier to test a liveness of the object included in the input image. Based on the extracted features and the learned parameters, the classifier may output a signal indicating whether the object included in the input image corresponds to a real object or a fake object.

Figure 6:
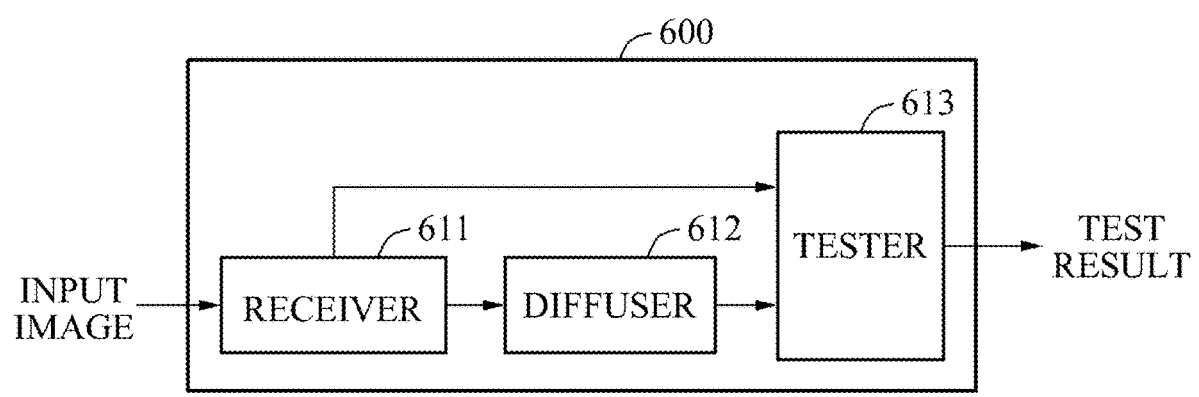
FIG. 6 illustrates a liveness testing apparatus according to an example embodiment.

FIG. 6 illustrates a liveness testing apparatus 600 according to an example embodiment.

Referring to FIG. 6, the liveness testing apparatus 600 includes: a receiver 611, a diffuser 612; and a tester 613. The receiver 611 may correspond to the receiver 311 shown in FIG. 3.

In example operation, the receiver 611 receives an input image, and outputs the input image to the diffuser 612 and the tester 613.

Although element 612 is referred to as a diffuser and the example embodiment shown in FIG. 6 will be described with regard to a diffusion operation, the element 612 may be more generally referred to as a filter or filter circuit 612. Moreover, any suitable filtering operation may be used as desired.

The diffuser 612 diffuses a plurality of pixels corresponding to an object included in the input image by iteratively updating values of the plurality of pixels corresponding to the object included in the input image based on a diffusion equation. In one example, the diffuser 612 may diffuse the plurality of pixels corresponding to the object included in the input image using Equation 1 discussed above.

The diffuser 612 may iteratively update the values of the plurality of pixels corresponding to the object included in the input image by applying an AOS scheme to the diffusion equation. In one example, the diffuser 612 may diffuse the plurality of pixels corresponding to the object included in the input image using Equation 3 discussed above. The diffuser 612 may output a diffusion image generated when the plurality of pixels are diffused.

Still referring to FIG. 6, the tester 613 tests a liveness of the object included in the input image based on diffusion speeds of the plurality of pixels. In one example, the tester 613 may test the liveness of the object by estimating a surface property related to the object based on the diffusion speeds. The surface property refers to a property related to a surface of the object, and may include, for example, a light-reflective property of the surface of the object, a number of dimensions of the surface of the object, and/or a material of the surface of the object.

The tester 613 may analyze a distribution of light energy included in the input image to estimate the surface property related to the object included in the input image. In one example, the tester 613 may analyze the distribution of the light energy included in the input image to determine whether the object included in the input image has a surface property (one or more characteristics) of a medium displaying a face (e.g., a 2D flat surface) or a surface property (one or more characteristics) of an actual face of a user (e.g., a 3D structure).

When the object included in the input image is determined to have a surface property of a medium displaying a face (e.g., a 2D flat surface), the tester 613 may output a signal corresponding to a failed test. That is, for example, when the tester 613 determines that the object included in the input image has a surface property of a medium displaying a face (e.g., a 2D flat surface), the tester 613 may output a signal indicative of a failed test. When the object included in the input image is determined to have a surface property of an actual face of a user (e.g., a 3D structure), the tester 613 may output a signal corresponding to a successful test. That is, for example, when the tester 613 determines that the object included in the input image has a surface property of an actual face of a user (e.g., a 3D structure), the tester 613 may output a signal indicative of a successful test.

In another example, the tester 613 may test the liveness of the object by calculating statistical information related to the diffusion speeds. As discussed above, a 2D object and a 3D object have different light-reflective properties. And the different light-reflective properties between the 2D object and the 3D object may be modeled based on diffusion speeds.

In this example, the tester 613 may calculate a diffusion speed based on the input image from the receiver 611 and the diffusion image from the diffuser 612. In one example, the tester 613 may calculate a diffusion speed for each pixel using Equation 4 discussed above. To calculate statistical information related to diffusion speeds, the tester 613 may extract a small-scale region using Equation 5. The extracted small-scale region may be represented as an SR map. The tester 613 may then determine the liveness of the object included in the input image using Equation 6, 7, 8 or 9.

The tester 613 may test the liveness of the object included in the input image based on a variety of diffusion speed based statistical information. The tester 613 may use a distribution of pixels having diffusion speeds greater than or equal to a given, desired, or alternatively predetermined, threshold value. The tester 613 may also use diffusion speed based statistical information without using an SR map.

When the calculated statistical information corresponds to statistical information related to the medium displaying the face, the tester 613 may output a signal corresponding to a failed test. When the calculated statistical information corresponds to statistical information related to the actual face of the user, the tester 613 may output a signal corresponding to a successful test. That is, for example, when the calculated statistical information is indicative of a medium displaying the face, the tester 613 may output a signal indicating a failed test, whereas when the calculated statistical information is indicative of an actual face of the user, the tester 613 may output a signal indicating a successful test.

The liveness testing apparatus 600 may test the liveness of the object based on a single input image. The single input image may correspond to a single picture, a single image, or a still image of a single frame.

Image Processing According to Example Embodiments

Figure 7:
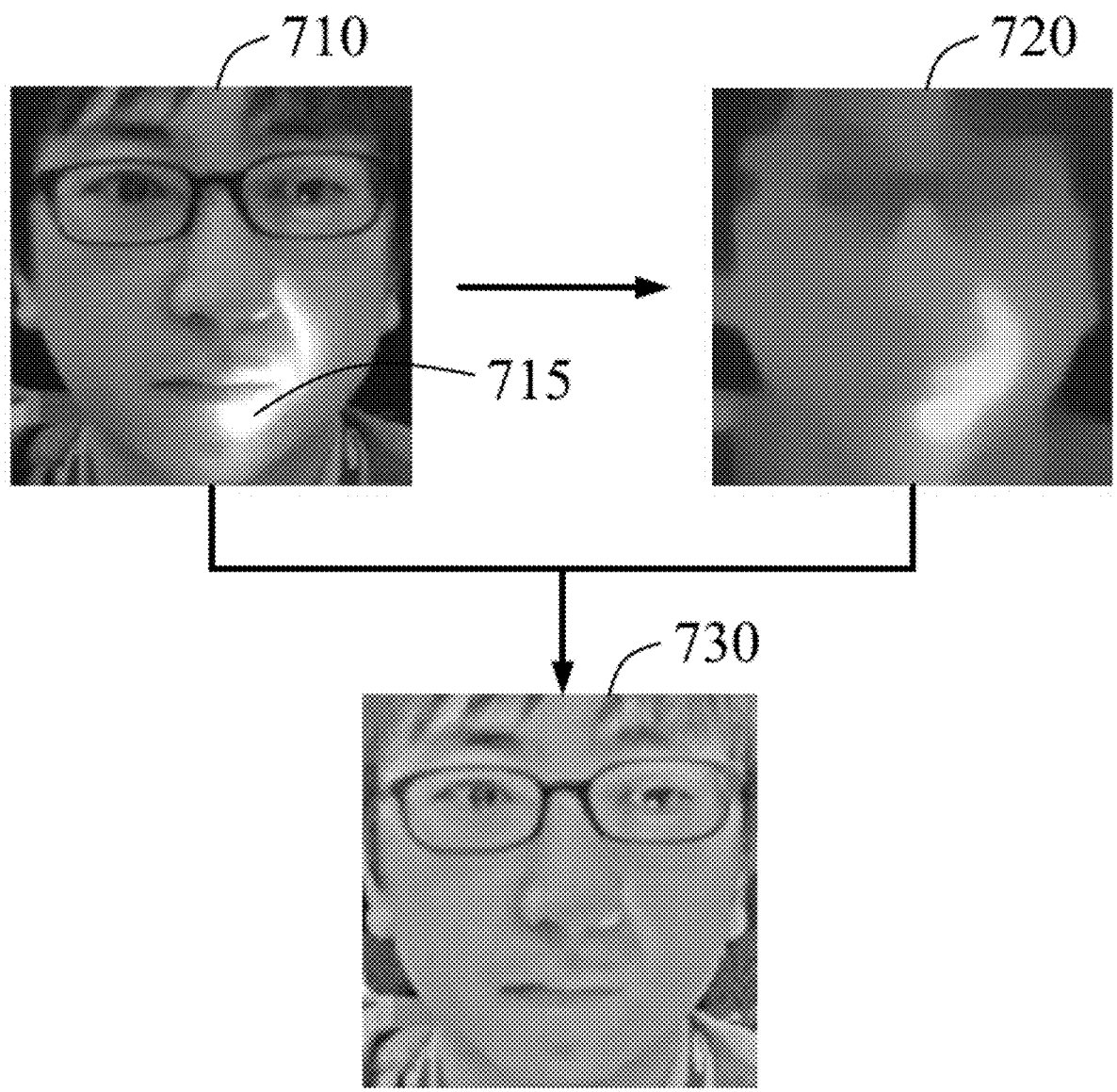
FIG. 7 illustrates an example input image and example images processed according to an example embodiment.
Figure 8:
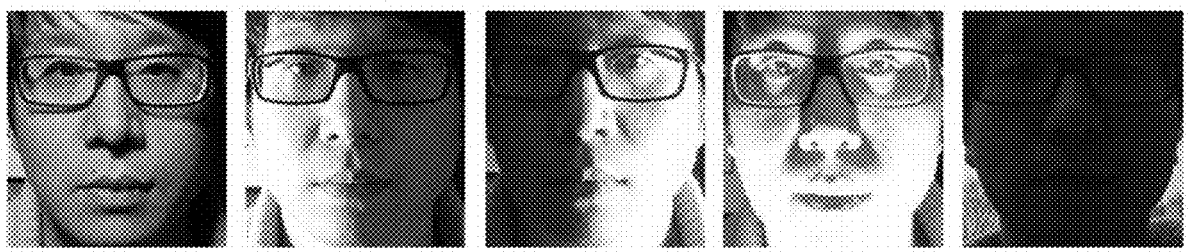
FIG. 8 illustrates example changes in an input image as a result of changes in illumination, according to example embodiments.

FIG. 7 is a flow diagram illustrating image processing according to example embodiments. FIG. 8 illustrates example changes in an input image depending on illumination according to example embodiments Referring to FIG. 7, an input image 710 includes a face of a user. The face of the user included in the input image 710 is affected (e.g., greatly or substantially affected) by illumination. For example, referring to FIG. 8, although a face of the same user is photographed, different images may be generated depending on illumination. When an input image is vulnerable to changes in illumination, reliability of face recognition and/or user verification may decrease (e.g., considerably or substantially decrease), and/or a computational complexity may increase (e.g., substantially or considerably increase).

An image processing method and/or apparatus according to one or more example embodiments may generate an image less susceptible (e.g., impervious) to changes in illumination from an input image. An image processing method and/or apparatus according to one or more example embodiments may also generate an image that is substantially unaffected by illumination on an object when the input image is obtained. One or more example embodiments may provide technology that may generate an image less susceptible (e.g., impervious) to changes in illumination, thereby increasing reliability of face recognition and/or user verification, and/or reducing computational complexity of face recognition and/or user verification.

Still referring to FIG. 7, the input image 710 includes an illumination component 715 and a non-illumination component. In this example, the illumination component 715 refers to a component, from among components constituting pixel values, that is affected (e.g., substantially affected) by external illumination. The non-illumination component refers to a component, from among components constituting pixel values, that is substantially unaffected by external illumination. The image processing apparatus may separate the illumination component 715 from the input image 710 to generate an image less susceptible (e.g., impervious) to changes in illumination.

The image processing apparatus may detect a face region from an input image. In this example, example embodiments may be applicable to the face region detected from the input image. Hereinafter, the term "face image" refers to an input image including a face, or a face region extracted from the input image.

A face image may be expressed based on an illumination component and a non-illumination component. The face image may be based on a Lambertian model, as shown below in Equation 10.

$$I = w \cdot v \qquad \text{[Equation 10]}$$

In Equation 10, I denotes a face image, w denotes an illumination component, and v denotes a non-illumination component. With regard to the example shown in FIG. 7, I corresponds to the input image 710, w corresponds to the image 720 related to the illumination component, and v corresponds to the image 730 related to the non-illumination component.

The image 720 related to the illumination component may include the illumination component 715, whereas the image 730 related to the non-illumination component may not include the illumination component 715. Thus, the image 730 related to the non-illumination may be an image less susceptible (e.g., impervious) to changes in illumination. The image 730 related to the non-illumination component may also be referred to as a canonical image.

The illumination component 715 may have a relatively high probability of being distributed in a large-scale region of the image. Thus, the image 720 related to the illumination component may be an image corresponding to a large-scale region. The illumination component 715 may have a relatively low probability of being distributed in a small-scale region. Thus, the image 730 related to the non-illumination component may be an image corresponding to a small-scale region.

The image processing apparatus may generate the image 730 related to the non-illumination component based on the input image 710. In one example, the image processing apparatus may receive the input image 710, and generate the image 720 related to the illumination component based on the input image 710. The image processing apparatus may calculate the image 730 related to the non-illumination component based on the input image 710 and the image 720 related to the illumination component using Equation 10 shown above.

According to at least one example embodiment, the image processing apparatus may diffuse the input image 710 to generate the image 720 related to the illumination component. Diffusion speeds of pixels belonging to the small-scale region may be greater than diffusion speeds of pixels belonging to the large-scale region. The image processing apparatus may separate the small-scale region and the large-scale region based on a difference in diffusion speeds. The image processing apparatus may diffuse a plurality of pixels included in the input image 710 a number of times corresponding to a given, desired, or alternatively predetermined, iteration count (e.g., about 20) to generate the image 720 related to the illumination component corresponding to the large-scale region.

According to at least one example embodiment, the image processing apparatus may iteratively update values of the plurality of pixels using a diffusion equation. In one example, the image processing apparatus may diffuse the plurality of pixels corresponding to the face included in the input image 710 using Equation 11 shown below.

$$u_{k+1} = u^k + \text{div}(d(|\nabla u^k|)\nabla u^k) \quad \text{[Equation 11]}$$

In Equation 11, k denotes an iteration count, $u^k$ denotes a value of a pixel after a k-th iteration, $u^{k+1}$ denotes a value of a pixel after a (k+1)-th iteration, and $u^k$ corresponds to $u^k(x,y)$, which is a value of a pixel at coordinates (x,y) in an image after k diffusions. The value $u^{k+1}$ corresponds to $u^{k+1}(x,y)$, which is a value of a pixel at coordinates (x,y) in an image after (k+1) diffusions. In this example, $u^0$ denotes a value of a pixel in the input image 710. When a final iteration count corresponds to "L", $u^L$ denotes a value of a pixel in the image 720 related to the illumination component.

As before, $\nabla$ denotes a gradient operator, div( ) denotes a divergence function, and d( ) denotes a diffusivity function. The diffusivity function may be given, desired, or alternatively predetermined. In one example, the image processing apparatus may define the diffusivity function as shown below in Equation 12.

$$d(|\nabla u|) = 1/(|\nabla u| + \beta) \quad \text{[Equation 12]}$$

In Equation 12, β denotes a small positive number. When the diffusivity function defined in Equation 12 is used, a boundary of a face may be preserved relatively well during the diffusion process. When the diffusivity function corresponds to a function of pixel gradient $\nabla u$ as shown in Equation 12, the diffusion equation is nonlinear. Herein, an image generated by diffusion is referred to as a diffusion image. When the diffusivity function is nonlinear, an image generated by diffusion is referred to as a nonlinear diffusion image.

Equation 12 is provided as an example of the diffusivity function, however, example embodiments may utilize other diffusivity functions. For example, one of a plurality of candidate diffusivity functions may be selected based on an input image.

Moreover, although example embodiments are discussed with regard to diffusivity functions, other filter functions may also be used, as mentioned above.

According to at least some example embodiments, the image processing apparatus may apply an AOS scheme to solve Equation 11. In one example, the image processing apparatus may diffuse the plurality of pixels corresponding to the face included in the input image 710 using Equation 13 shown below.

$$u^{k+1} = \frac{1}{2}\left((I - 2\tau A_x(u^k))^{-1} + (I - 2\tau A_y(u^k))^{-1}\right)u^k \quad \text{[Equation 13]}$$

In Equation 13, I denotes a value of a pixel in the input image 710, $A_x$ denotes a horizontal diffusion matrix, $A_y$ denotes a vertical diffusion matrix, and τ denotes a time step. The final iteration count L and the time step τ may be given, desired, or alternatively predetermined. In general, when the time step τ is set to be relatively small and the final iteration count L is set to be relatively large, a reliability of $u^L$, which denotes a value of a final diffused pixel, may increase.

Using the AOS scheme to solve Equation 11 may enable the image processing apparatus to reduce the final iteration count L. When the AOS scheme is used, the reliability of the final diffused pixel $u^L$ may be sufficiently high although the time step τ of a given, desired, or alternatively predetermined, size is used. Image processing apparatuses according to one or more example embodiments may increase an efficiency of operations for diffusion processes using the AOS scheme to solve diffusion equations.

The image processing apparatus may generate the image 730 related to the non-illumination component based on the input image 710 and the image 720 related to the illumination component. In one example, the image processing apparatus may generate the image 730 related to the non-illumination component using Equation 14 or 15. Since 'w' in Equation 10 corresponds to $u^L$, Equations 14 and 15 may be derived from Equation 10.

$$v = I/u^L \quad \text{[Equation 14]}$$

$$\log v = \log I - \log u^L \quad \text{[Equation 15]}$$

In Equations 14 and 15, I denotes a face image, and may correspond to, for example, the input image 710. The face image I may also correspond to $u^0$. The final diffused pixel $u^L$ denotes a large-scale region, and may correspond to, for example, the image 720 related to the illumination component. Still referring to Equations 14 and 15, v denotes a small-scale region, and may correspond to, for example, the image 730 related to the non-illumination component.

Figure 9:
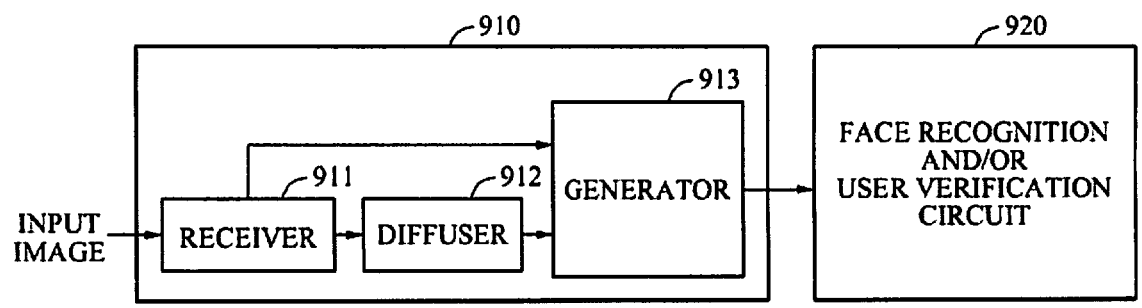
FIG. 9 illustrates an image processing apparatus according to an example embodiment.

FIG. 9 illustrates an image processing apparatus 910 according to an example embodiment. Also shown in FIG. 9 is a face recognition and/or user verification circuit 920, which will be discussed in more detail later.

Referring to FIG. 9, the image processing apparatus 910 includes: a receiver 911; a diffuser 912; and a generator 913.

As with FIG. 6, although element 912 in FIG. 9 is referred to as a diffuser and the example embodiment shown in FIG. 9 will be described with regard to a diffusion operation, the element 912 may be more generally referred to as a filter or filter circuit 912. Moreover, as mentioned above, the filter 912 may utilize any suitable filtering operation, rather than the diffusion process discussed here.

In example operation, the receiver 911 may receive an input image. In a more specific example, the receiver 911 may receive an input image generated by an image sensor (not shown). The receiver 911 may be connected to the image sensor using a wire, wirelessly, or via a network. Alternatively, the receiver 911 may receive the input image from a storage device, such as, a main memory, a cache memory, a hard disk drive (HDD), a solid state drive (SSD), a flash memory device, a network drive, etc.

The diffuser 912 may diffuse a plurality of pixels corresponding to an object included in the input image. In one example, the object may correspond to a face of a user. The diffuser 912 may iteratively update values of the plurality of pixels corresponding to the object included in the input image based on a diffusion equation. In one example, the diffuser 912 may diffuse the plurality of pixels corresponding to the object included in the input image according to Equation 11.

The diffuser 912 may iteratively update the values of the plurality of pixels corresponding to the object included in the input image by applying an AOS scheme to the diffusion equation. In one example, diffuser 912 may diffuse the plurality of pixels corresponding to the object included in the input image using Equation 13. The diffuser 912 may output a diffusion image generated when the plurality of pixels are diffused. The diffusion image may correspond to an image related to an illumination component (e.g., 720 in FIG. 7).

Still referring to FIG. 9, the generator 913 may generate an output image based on the input image and the diffusion image. The generator 913 may generate the output image using Equation 14 or 15. The output image may correspond to an image related to a non-illumination component (e.g., 730 in FIG. 7). The generator 913 may output the output image to the face recognition and/or user verification circuit 920. The face recognition and/or user verification circuit 920 may perform any well-known face recognition and/or user verification circuit 920 operation as will be discussed in some detail later. Alternatively, the generator 913 may output the output image to a memory (not shown).

According to at least some example embodiments, the image processing apparatus 910 may generate the output image based on a single input image. The single input image may correspond to a single picture, a single image, or a still image of a single frame. Still referring to FIG. 9, in one example the face recognition and/or user verification circuit 920 may recognize a face included in the input image based on the output image from the generator 913. The output image may correspond to an image related to the non-illumination component and less susceptible (e.g., impervious) to changes in illumination. The face recognition and/or user verification circuit 920 may recognize the face included in the input image based on an image less susceptible (e.g., impervious) to changes in illumination. Thus, accuracy and/or a reliability of the face recognition may increase. When an image less susceptible (e.g., impervious) to changes in illumination is used, a performance of an alignment operation may increase in a relatively low-luminance environment.

In another example, the face recognition and/or user verification circuit 920 may verify the user based on the output image from the generator 913. The image processing apparatus 910 may verify the user by recognizing the face of the user based on the output image. The output image may correspond to an image related to the non-illumination component and less susceptible (e.g., impervious) to changes in illumination. The image processing apparatus 910 may verify the user based on an image less susceptible (e.g., impervious) to a change in illumination. Thus, accuracy and/or a reliability of the user verification may increase.

Flowchart According to Example Embodiments

Figure 10:
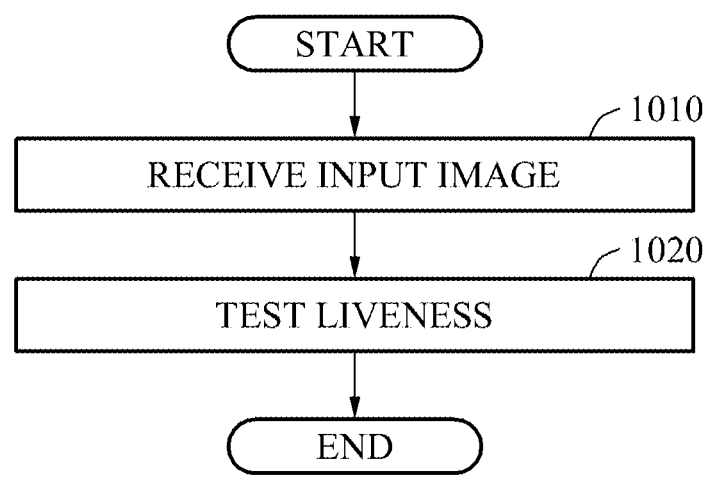
FIG. 10 illustrates a liveness testing method according to an example embodiment.

FIG. 10 is a flow chart illustrating a liveness testing method according to an example embodiment. In some cases, the flow chart shown in FIG. 10 will be discussed with regard to the liveness testing apparatus shown in FIGS. 3 and 6.

Referring to FIG. 10, at operation 1010 the liveness testing apparatus receives an input image. At operation 1020, the liveness testing apparatus tests a liveness of an object included in the received input image.

With regard to the liveness testing apparatus 310 shown in FIG. 3, for example, at operation 1010, the receiver 311 receives the input image, and the tester 312 tests a liveness of the object included in the received input image at operation 1020. The tester 312 may test the liveness of the object included in the input image received at the receiver 311 based on whether the object in the input image has one or more characteristics of a flat surface or a 3D structure. The details of the operation performed by the tester 312 are discussed above with regard to FIG. 3, and thus, a detailed discussion is not repeated here.

With regard to the liveness testing apparatus 600 shown in FIG. 6, for example, at operation 1010 the receiver 611 receives the input image. At operation 1020, the diffuser 612 diffuses a plurality of pixels corresponding to the object included in the input image received at the receiver 611, and the tester 613 tests the liveness of the object based on diffusion speeds of the plurality of pixels. The details of the operation performed by the diffuser 612 and the tester 613 are discussed above with regard to FIG. 6, and thus, a detailed discussion is not repeated here.

Figure 11:
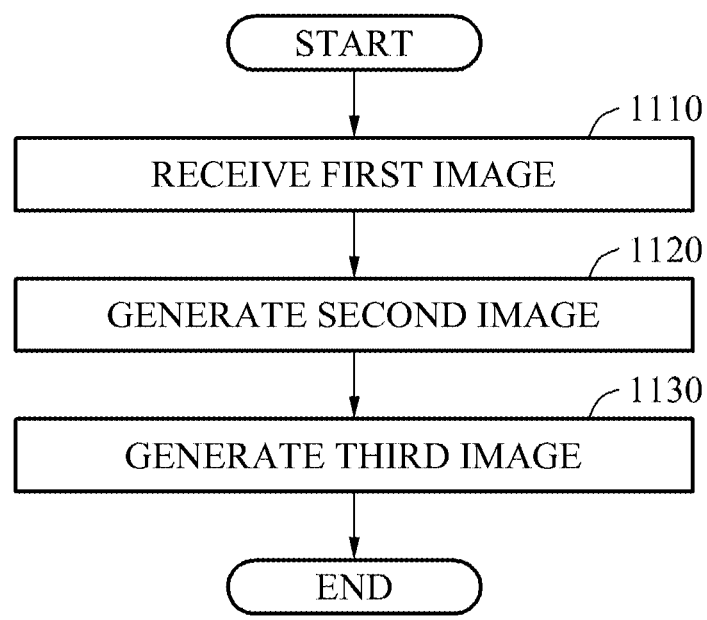
FIG. 11 illustrates an image processing method according to an example embodiment.

FIG. 11 is a flow chart illustrating an image processing method according to an example embodiment. For example purposes, the image processing method shown in FIG. 11 will be discussed with regard to the image processing apparatus shown in FIG. 9.

Referring to FIG. 11, at operation 1110, the image processing apparatus receives a first image. At operation 1120, the image processing apparatus generates a second image, and at operation 1130 the image processing apparatus generates a third image.

The first image may correspond to an input image (e.g., 710 in FIG. 7), the second image may correspond to an image related to an illumination component (e.g., 720 in FIG. 7), and the third image may correspond to an image related to a non-illumination component (e.g., 730 in FIG. 7).

In more detail, with regard to FIGS. 9 and 11, for example, at operation 1110 the receiver 911 receives a first (input) image.

At operation 1120, the diffuser 912 generates a second image based on the first (input) image. In this example, the second image is an image related to an illumination component (e.g., 720 in FIG. 7).

At operation 1130, the generator generates a third (output) image based on the first (input) image and the second image generated by the diffuser 912. In this case, the third (output) image is an image related to a non-illumination component (e.g., 730 in FIG. 7). The details of the operations performed by the diffuser 912 and the generator 913 are discussed above with regard to FIG. 9, and thus, a detailed discussion is not repeated here.

More generally, the descriptions provided with reference to FIGS. 1A through 9 may be applicable to operations of FIGS. 10 and 11, and thus, more detailed descriptions are omitted for conciseness.

Figure 12:
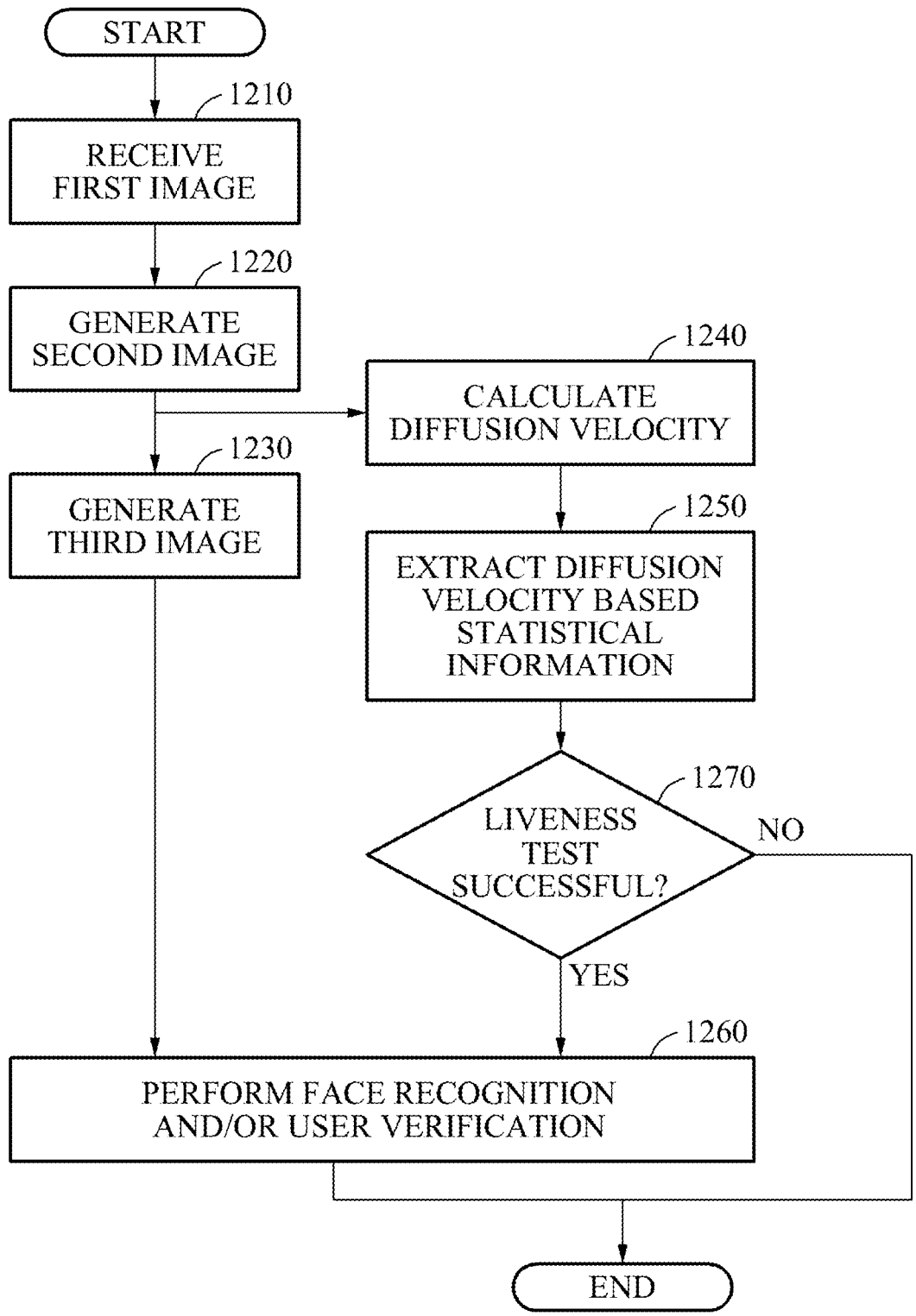
FIG. 12 illustrates an image processing and authentication/verification method according to another example embodiment.

FIG. 12 illustrates an image processing method according to another example embodiment.

The example embodiment shown in FIG. 12 combines the liveness testing method of FIG. 10 with the image processing method of FIG. 11. For example purposes, the method shown in FIG. 12 will be described with regard to the image processing apparatus shown in FIG. 9. The details of the operations described with regard to FIG. 12 are provided above with regard to, for example, FIGS. 3, 6, 9, 10 and 11, and thus, a detailed discussion is not repeated here.

Referring to FIG. 12, at operation 1210 the receiver 911 of the image processing apparatus 910 receives a first image. The first image may correspond to an input image including a face of a user. The receiver 911 outputs the first image to the diffuser 912 and the generator 913.

At operation 1220, the diffuser 912 generates a second image based on the first image received at the receiver 911. The diffuser 912 generates the second image by diffusing the first image from the receiver 911. The second image may be an image related to an illumination component.

At operation 1240, the generator 913 calculates a diffusion speed for each pixel based on the first image and the second image. The diffusion speed for each pixel may be calculated based on a difference between a pixel value in the second image and a corresponding pixel value in the first image.

At operation 1250, the generator 913 extracts statistical information based on diffusion speeds. For example, the generator 913 calculates a number of pixels having diffusion speeds greater than a given, desired, or alternatively predetermined, threshold value.

At operation 1270, the generator 913 performs a liveness test based on the diffusion speed based statistical information. In one example, the generator 913 determines whether the input image corresponds to a real 3D object based on the number of pixels having diffusion speeds greater than the threshold value.

If the generator 913 determines that the input image does not correspond to a real 3D object (the liveness test fails), then the face recognition and/or user verification circuit 920 does not perform face recognition and/or user verification at operation 1260, and the process terminates.

Returning to operation 1270, if the generator 913 determines that the input image does correspond to a live 3D object (the liveness test succeeds), then face recognition and/or user verification is performed. In this example, an image less susceptible (e.g., impervious) to changes in illumination may be generated for use in face recognition and/or user verification operations.

Still referring to FIG. 12, at operation 1230 the generator 913 generates a third image based on the first image and the second image. In one example, the generator 913 calculates the third image based on a ratio of the first image to the second image as discussed above with regard to Equation 14 or a difference between the first image and the second image in a log domain as discussed above with regard to Equation 15. The third image may be an image related to a non-illumination component and impervious to a change in illumination.

At operation 1260, the face recognition and/or user verification circuit 920 performs face recognition and/or user verification based on the third image. In the example embodiment shown in FIG. 12, the face recognition and/or user verification circuit 920 performs the face recognition and/or user verification operations in operation 1260 only when the input image does correspond to a real 3D object (the liveness test succeeds). In this example, the face recognition and/or user verification may be performed based on the third image corresponding to the image less susceptible (e.g., impervious) to changes in illumination.

Details of the descriptions provided with reference to FIGS. 1A through 11 may be applicable to operations of FIG. 12, and thus, duplicated descriptions are omitted for conciseness.

Figure 13:
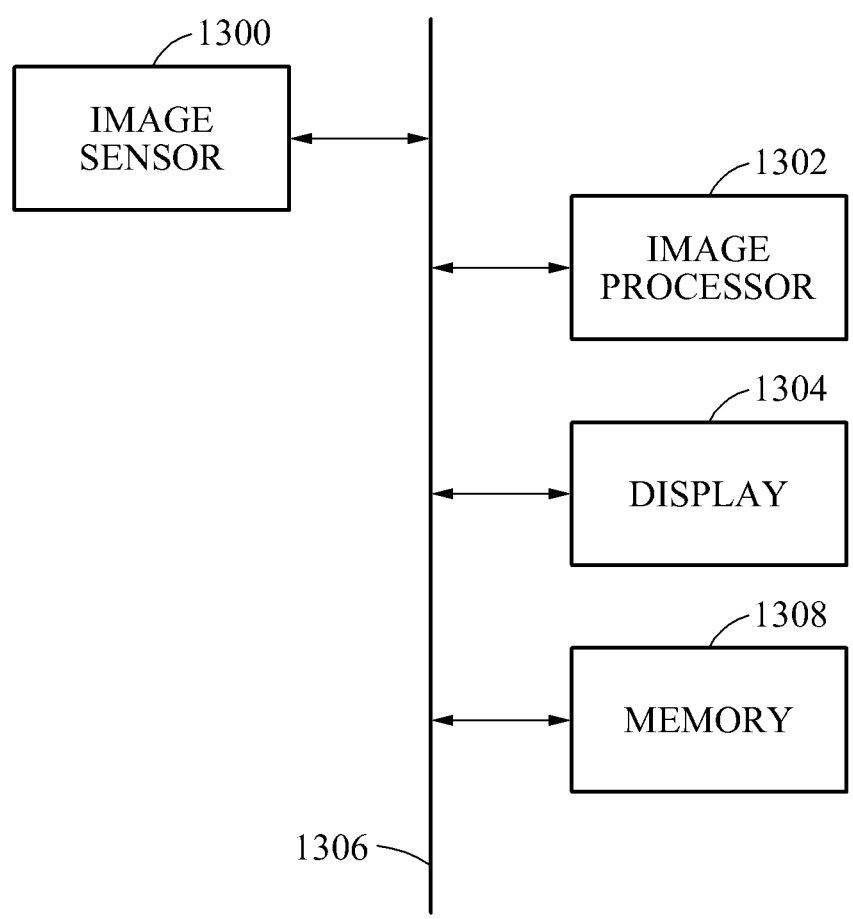
FIG. 13 is a block diagram illustrating an electronic system according to an example embodiment.

FIG. 13 is a block diagram illustrating an electronic system according to an example embodiment.

Referring to FIG. 13, the electronic system includes, for example: an image sensor 1300, an image signal processor (ISP) 1302, a display 1304 and a memory 1308. The image sensor 1300, the ISP 1302, the display 1304 and the memory 1308 communicate with one another via a bus 1306.

The image sensor 1300 may be the image sensor 115 described above with regard to FIGS. 1A and 1B. The image sensor 1300 is configured to capture an image (also referred to as image data) in any well-known manner (e.g., by converting optical images into electrical signals). The image is output to the ISP 1302.

The ISP 1302 may include one or more of the apparatuses and/or may perform one more of the methods discussed above with regard to discussed above with regard to FIGS. 1A through 12. The ISP 1302 may also include the face recognition and/or user verification circuit 920 to perform face recognition and/or user verification operations discussed above with regard to FIGS. 1A through 12. In a more specific example, the ISP 1302 may include the liveness testing apparatus 310 shown in FIG. 3, the liveness testing apparatus 610 shown in FIG. 6, the image processing apparatus 910 shown in FIG. 9 and/or the face recognition and/or user verification circuit 920 shown in FIG. 9. The memory 1308 may store images captured by the image sensor 1300 and/or generated by the liveness testing apparatus and/or the image processing apparatus. The memory 1308 may be any suitable volatile or non-volatile memory. The display 1304 may display images captured by the image sensor 1300 and/or generated by the liveness testing apparatus and/or the image processing apparatus.

The ISP 1302 may also be configured to execute a program and control the electronic system. The program code to be executed by the ISP 1302 may be stored in the memory 1308.

The electronic system shown in FIG. 13 may be connected to an external device (e.g., a personal computer or a network) through an input/output device (not shown) and may exchange data with the external device.

The electronic system shown in FIG. 13 may embody various electronic systems including: a mobile device, such as a mobile phone, a smartphone, a personal digital assistant (PDA), a tablet computer, a laptop computer, etc.; a computing device, such as a personal computer (PC), a tablet PC, a netbook; or an electronic product, such as a television (TV) or smart TV, a security device for a gate control, etc.

Figure 14:
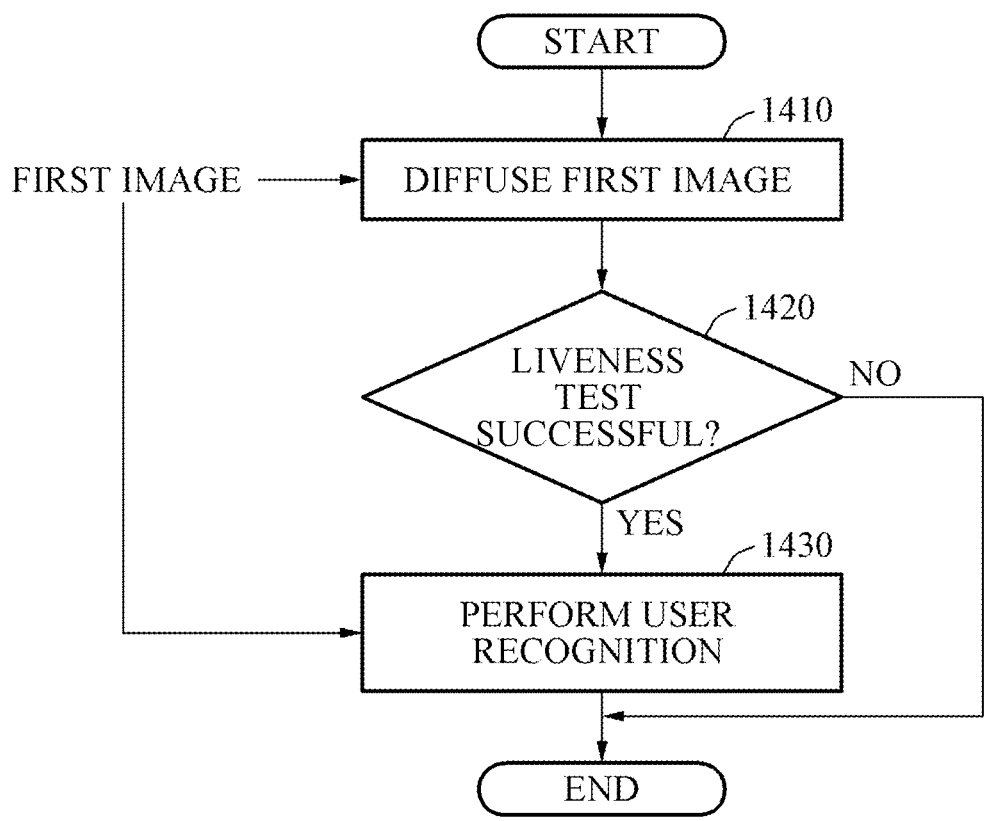
FIG. 14 is a flowchart illustrating a user recognition method according to an example embodiment.

FIG. 14 is a flowchart illustrating a user recognition method according to an example embodiment. Each operation of the user recognition method of FIG. 14 may be performed by a user recognition apparatus. The user recognition apparatus may be implemented using a software module, a hardware module, or a combination thereof.

Referring to FIG. 14, at operation 1410, the user recognition apparatus extracts a first feature of a first image. For example, at operation 1410, the user recognition apparatus extracts the first feature by diffusing the first image. The first image is an image acquired by capturing a user, and may include a face of the user. The first feature of the first image may be a diffusion-based feature such as a diffusion speed, for example.

At operation 1420, the user recognition apparatus performs a liveness test based on the first feature of the first image. The descriptions provided with reference to FIGS. 1 through 13 may be applicable to operations 1410 and 1420, and thus more detailed descriptions are omitted for conciseness. For example, operation 1420 may correspond to operation 1270 of FIG. 12.

If the liveness test succeeds, the user recognition apparatus extracts a second feature of the first image, and performs user recognition based on the second feature of the first image at operation 1430. The user recognition may include verification to determine whether the user in the first image matches a pre-registered user, or identification to determine a user corresponding to the user in the first image, among a plurality of users.

The second feature of the first image may be determined in various ways. For example, the second feature of the first image may be a feature extracted by processing the first image to recognize a face of the user, a feature extracted from an image generated by diffusing the first image, or a combination thereof.

The user recognition of operation 1430 may be performed only when the liveness test of operation 1420 succeeds. Although not shown in FIG. 14, if the liveness test fails, the user recognition apparatus may receive a new image and perform a liveness test with respect to the new image. If the liveness test with respect to the new image succeeds, the user recognition apparatus may perform user recognition using the new image. In an example, the first image and the new image may correspond to different frames in a video.

Although not shown in FIG. 14, in another example, the first image may be a video. In this example, the liveness test may be performed based on at least one first frame in the video, and user recognition may be performed based on at least one second frame in the video based on a result of the liveness test. The at least one first frame and the at least one second frame may correspond to consecutive frames in the video. The at least one frame and the at least one second frame may be the same or different frames.

Various criteria may be determined for a liveness test with respect to the video based on the at least one first frame. If any one of the at least one first frame included in the video passes the liveness test, the video may be determined to be a live video. If any one of the first frame included in the video fails the liveness test, the video may be determined to be a fake video. If a predetermined number of consecutive first frames, for example, three consecutive first frames, pass the liveness test, the video may be determined to be a live video.

When the video is determined to be a live video through the liveness test performed based on the at least one first frame, user recognition may be performed based on the at least one second frame in the video. In this example, the at least one second frame may be the same as or different from the at least one first frame. For example, a portion of frames included in the video may be suitable for a liveness test, but unsuitable for user recognition. Conversely, a portion of the frames included in the video may be suitable for user recognition, but unsuitable for a liveness test. Through the example provided above, the liveness test may be performed based on at least one first frame more suitable for the liveness test, among the plurality of frames included in the video, and the user recognition may be performed based on at least one second frame more suitable for the user recognition.

The examples described with respect to FIGS. 1 through 14 may be applicable to user verification in various fields. For example, the examples may be applied to user verification for electronic commerce. Information related to a payment method of a user, for example, a credit card, may be registered in a terminal in advance, and a payment may be easily performed using the pre-registered payment method through user verification at a point in time at which an actual payment is needed. In another example, in a case in which payment information is input from the user at the point in time at which the actual payment is needed, user verification may be requested for payment approval.

In this example, the terminal may acquire an input image including a face of the user using a camera in response to reception of a request for an electronic commerce payment from the user. When a liveness test and/or user verification is performed based on the input image, the electronic commerce payment may be performed based on a corresponding result.

A security module may be implemented to be separate from a payment module. The payment module may request user verification from the security module at a point in time at which a payment approval is needed. The security module may be executed in a safety region in an operating system. In response to reception of the user verification request from the payment module, the security module may receive the input image from the camera via a security channel, and perform a liveness test and/or user verification with respect to the input image. The security module may return a verification result to the payment module. The payment module may approve or reject a payment based on the verification result.

In another example, the examples may be applicable to user verification to unlock a screen, to execute a predetermined application, to execute a predetermined function in an application, or to access a predetermined folder or file. In response to a request for unlocking the screen, the terminal may acquire an input image including a face of a user, and perform a liveness test and/or user verification to determine whether the screen is to be unlocked. In response to a request for executing a predetermined application, executing a predetermined function in an application, or accessing a predetermined folder or file, the terminal may acquire an input image including a face of a user, and perform a liveness test and/or user verification to determine whether a corresponding operation is to be allowed.

The examples described with respect to FIGS. 1 through 14 may be applicable to user identification in various fields. For example, the examples may be applied to user identification to sort content associated with a user among a plurality of items of contents stored in a gallery. In response to a request for an access to the gallery, the terminal may acquire an input image including a face of a user using the camera, and identify the user by performing a liveness test and/or user identification based on the input image. When the user is identified, the terminal may sort content associated with the identified user among the plurality of items of contents stored in the gallery, and provide the sorted content to the user. In another example, rather than automatically sorting content in response to the access to the gallery, content associated with the user may be sorted and provided by an explicit request of the user, for example, a user input.

In the above examples, the terminal may include various computing devices such as a smartphone, a portable phone, a tablet computer, a laptop computer, a desktop computer, a wearable device, a smart vehicle, and a smart home appliance.

One or more example embodiments (e.g., liveness testing apparatuses, image processing apparatuses electronic systems, etc.) described herein may be implemented using hardware components and software components. For example, the hardware components may include microphones, amplifiers, band-pass filters, audio to digital convertors, and processing devices. A processing device may be implemented using one or more special purpose computers, such as, for example, a processor, a controller and an arithmetic logic unit, application-specific-integrated-circuit, system-on-chip device, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

Example embodiments described herein may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes embodied herein, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user recognition method comprising:
   receiving a first image acquired by capturing a user;
   performing a liveness test by extracting a first feature of the first image; and
   recognizing the user by extracting a second feature of the first image in response to a successful result of the liveness test, the second feature being different from the first feature, wherein
   the liveness test verifies whether an object corresponds to a real three-dimensional (3D) object or a fake two-dimensional (2D) representation of the object, and
   the first feature includes a degree of uniformity in a distribution of light energy included in a plurality of pixels corresponding to an object included in the first image.

2. The user recognition method of claim 1, further comprising, in response to a failed result of the liveness test:
   receiving a second image;
   performing a liveness test by extracting a first feature of the second image; and
   recognizing the user by extracting a second feature of the second image based on a result of the liveness test with respect to the second image.

3. The user recognition method of claim 2, wherein the first image corresponds to a first frame in a video, and the second image corresponds to a second frame in the video.

4. A user recognition method, comprising
   receiving a first image acquired by capturing a user;
   performing a liveness test by extracting a first feature of the first image;
   recognizing the user by extracting a second feature of the first image based on a result of the liveness test; and
   wherein the performing includes
      generating a second image by diffusing a plurality of pixels included in the first image,
      calculating diffusion speeds of the plurality of pixels based on a difference between the first image and the second image, and
      extracting the first feature based on the diffusion speeds of the plurality of pixels.

5. The user recognition method of claim 4, wherein the generating comprises:
   iteratively updating values of the plurality of pixels using a diffusion equation.

6. The user recognition method of claim 4, wherein the extracting the first feature comprises:
   estimating a surface property related to an object included in the first image based on the diffusion speeds of the plurality of pixels,
   wherein the surface property comprises at least one of a light-reflective property of a surface of the object, a number of dimensions of the surface of the object, or a material of the surface of the object.

7. The user recognition method of claim 4, wherein the extracting the first feature comprises at least one of:
calculating a number of pixels corresponding to a diffusion speed greater than or equal to a first threshold, among the diffusion speeds of the plurality of pixels;
calculating a distribution of the pixels corresponding to the diffusion speed greater than or equal to the first threshold, among the diffusion speeds of the plurality of pixels;
calculating at least one of an average or a standard deviation of the diffusion speeds; or
calculating a filter response based on the diffusion speeds of the plurality of pixels.

8. The user recognition method of claim 4, wherein the extracting the first feature comprises:
extracting a first-scale region from the first image based on the diffusion speeds of the plurality of pixels; and
calculating an amount of noise components included in the first-scale region based on a difference between the first-scale region and a result of applying median filtering to the first-scale region.

9. The user recognition method of claim 1, wherein the performing comprises:
determining whether the object has a planar property or a three-dimensional (3D) structural property, based on the first feature;
outputting a signal corresponding to a failed result of the liveness test in a case in which the object is determined to have the planar property; and
outputting a signal corresponding to the successful result of the liveness test in a case in which the object is determined to have the 3D structural property.

10. A user recognition method comprising:
receiving a first image acquired by capturing a user;
performing a liveness test by extracting a first feature of the first image; and
recognizing the user by extracting a second feature of the first image in response to a successful result of the liveness test, the second feature being different from the first feature,
wherein the liveness test verifies whether an object corresponds to a real three-dimensional (3D) object or a fake two-dimensional (2D) representation of the object, and
wherein the performing includes
calculating a degree of uniformity in a distribution of light energy included in a plurality of pixels corresponding to an object included in the first image based on the first feature,
outputting a signal corresponding to a failed result of the liveness test in a case in which the degree of uniformity in the distribution of light energy is greater than or equal to a threshold, and
outputting a signal corresponding to the successful result of the liveness test in a case in which the degree of uniformity in the distribution of light energy is less than the threshold.

11. The user recognition method of claim 1, wherein the performing further comprises at least one of:
determining whether the first feature corresponds to a feature related to a medium that displays a face or a feature related to an actual face;
outputting a signal corresponding to a failed result of the liveness test in a case in which the first feature corresponds to the feature related to the medium that displays a face; or
outputting a signal corresponding to the successful result of the liveness test in a case in which the first feature corresponds to the feature related to an actual face.

12. The user recognition method of claim 1, further comprising:
receiving a user verification request for approving an electronic commerce payment; and
approving the electronic commerce payment in a case in which the recognizing the user is successful.

13. The user recognition method of claim 1, further comprising:
receiving a user input which requires user verification; and
performing an operation corresponding to the user input in a case in which the recognizing the user is successful.

14. The user recognition method of claim 13, wherein the user input which requires user verification comprises at least one of:
a user input to unlock a screen,
a user input to execute an application,
a user input to execute a function in an application, or
a user input to access a folder or file.

15. The user recognition method of claim 1, further comprising:
receiving a user input related to a gallery including a plurality of items of content;
sorting content corresponding to the user among the plurality of items of content in the gallery in a case in which the recognizing the user is successful; and
providing the content to the user.

16. A non-transitory computer-readable medium comprising a program that, when executed on a computer device, causes the computer device to perform the method of claim 1.

17. A user recognition apparatus comprising a processor configured to:
perform a liveness test by extracting a first feature of a first image acquired by capturing a user;
recognize the user by extracting a second feature of the first image based on a result of the liveness test; and
wherein the processor is further configured to
generate a second image by diffusing a plurality of pixels included in the first image,
calculate diffusion speeds of the plurality of pixels based on a difference between the first image and the second image, and
extract the first feature based on the diffusion speeds of the plurality of pixels.

18. The user recognition method of claim 1, wherein the object is a face included in the first image; and
the liveness test verifies whether the face corresponds to a real three-dimensional (3D) face or a fake two-dimensional (2D) representation of the face.

* * * * *